(12) United States Patent  
Saitou et al.

(10) Patent No.: US 9,001,185 B2  
(45) Date of Patent: Apr. 7, 2015

(54) IMAGE PROCESSING APPARATUS, IMAGE PROCESSING METHOD, AND PROGRAM

(75) Inventors: Yuji Saitou, Tokyo (JP); Shuuji Okegawa, Chiba (JP)

(73) Assignee: Sony Corporation, Tokyo (JP)

(*) Notice: Subject to any disclaimer, the term of this patent is extended or adjusted under 35 U.S.C. 154(b) by 729 days.

(21) Appl. No.: 12/972,944

(22) Filed: Dec. 20, 2010

(65) Prior Publication Data  
US 2011/0157301 A1 Jun. 30, 2011

(30) Foreign Application Priority Data  
Dec. 28, 2009 (JP) ................. 2009-298946

(51) Int. Cl.  
H04N 7/00 (2011.01)  
H04N 5/232 (2006.01)

(52) U.S. Cl.  
CPC ....... *H04N 5/23293* (2013.01); *H04N 5/23238* (2013.01)

(58) Field of Classification Search  
None  
See application file for complete search history.

(56) References Cited

U.S. PATENT DOCUMENTS

| 4,566,763 A | 1/1986 | Greguss | |
|---|---|---|---|
| 2004/0169724 A1* | 9/2004 | Ekpar | 348/36 |
| 2011/0115879 A1* | 5/2011 | Homma et al. | 348/36 |
| 2011/0157163 A1 | 6/2011 | Suzuki | |
| 2011/0157312 A1 | 6/2011 | Kawakami | |

FOREIGN PATENT DOCUMENTS

| JP | 59-192220 | 10/1984 |
|---|---|---|
| JP | 2000-131738 A | 5/2000 |
| JP | 2003-304532 A | 10/2003 |
| JP | 2006-211105 A | 8/2006 |
| JP | 2010-068071 A | 3/2010 |
| JP | 2011-114496 A | 6/2011 |

OTHER PUBLICATIONS

Chinese Office Action mailed Feb. 24, 2014 in connection with Chinese Application No. 201010609061, and English translation thereof.

* cited by examiner

*Primary Examiner* — Sath V Perungavoor  
*Assistant Examiner* — Kate Luo  
(74) *Attorney, Agent, or Firm* — Wolf, Greenfield & Sacks, P.C.

(57) ABSTRACT

An image processing apparatus includes: a cut position determination unit determining a cut position at which an annular image is cut in a radial direction to maintain continuity of a subject in the annular image generated by an omnidirectional image capturing apparatus; and an image conversion unit converting the annular image into a long-rectangular-shaped panorama image by cutting the annular image at the cut position determined by the cut position determination unit and developing the cut annular image.

18 Claims, 15 Drawing Sheets

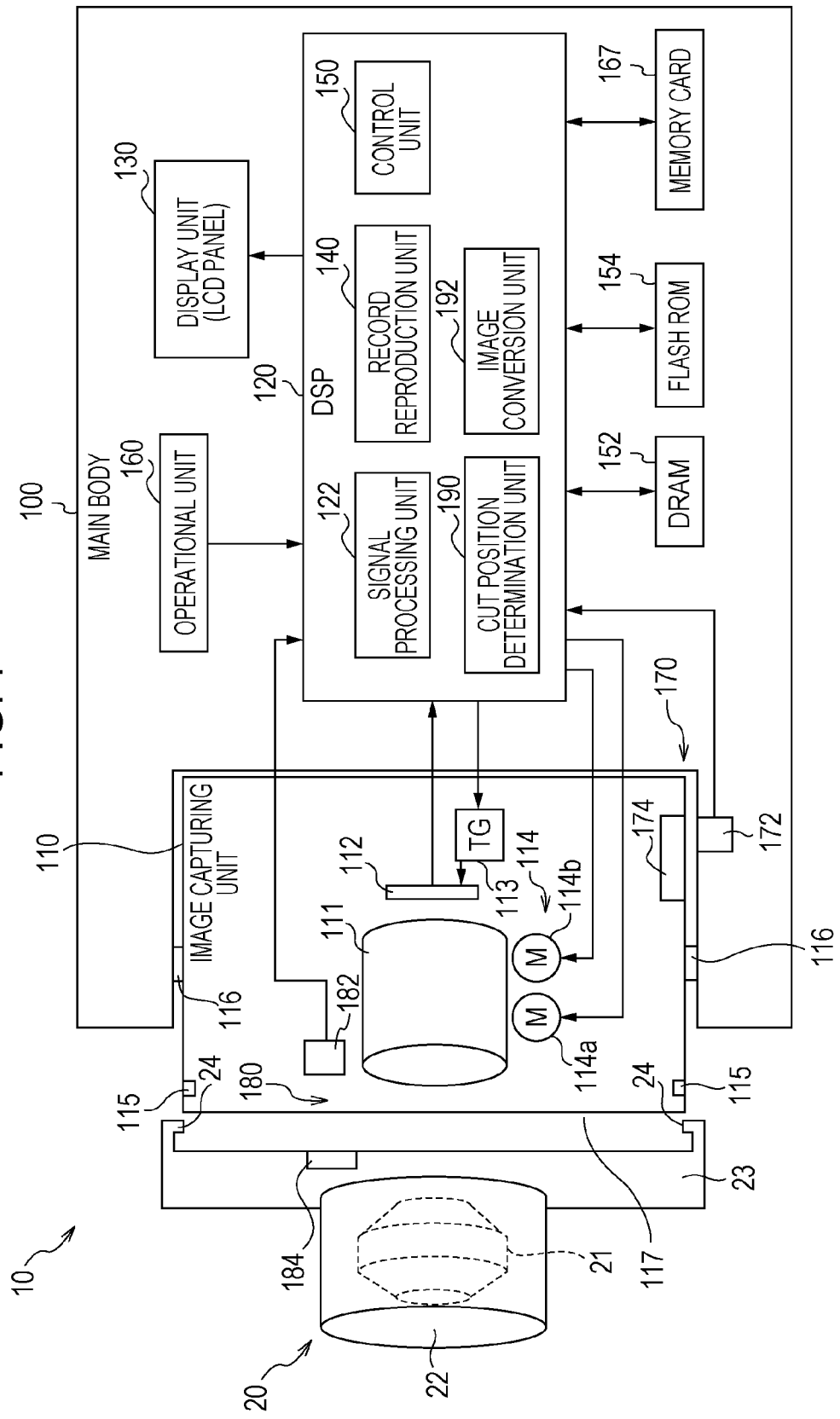

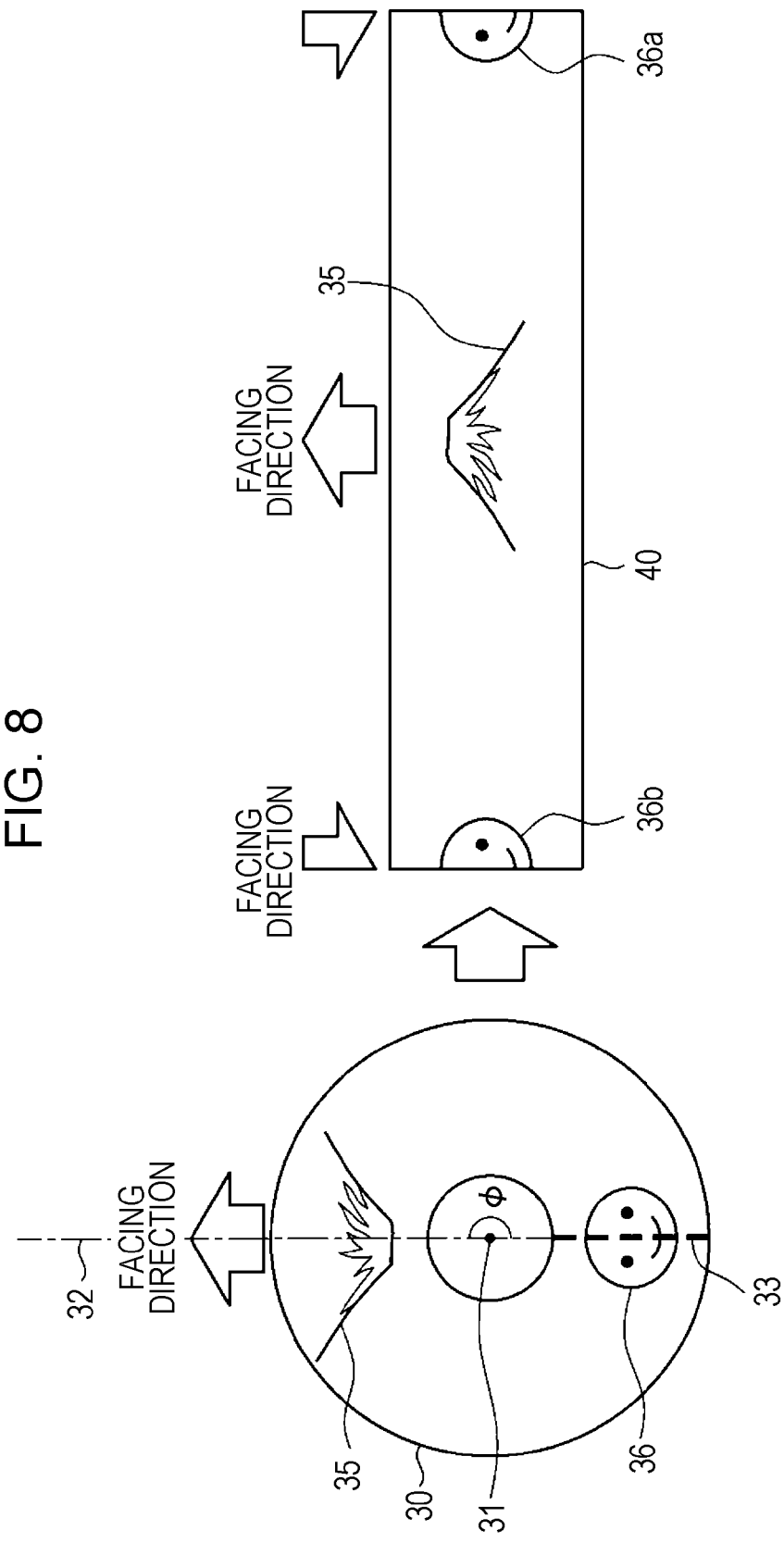

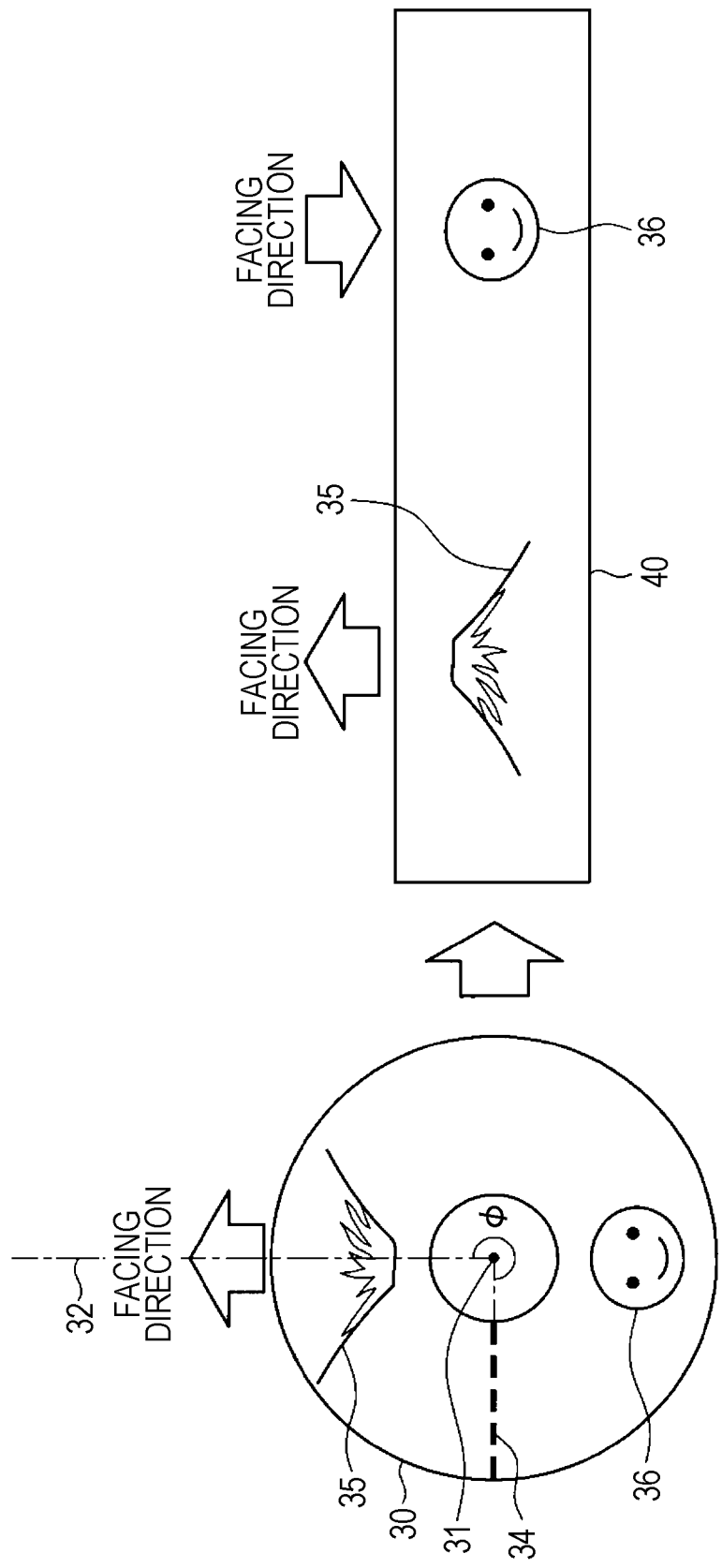

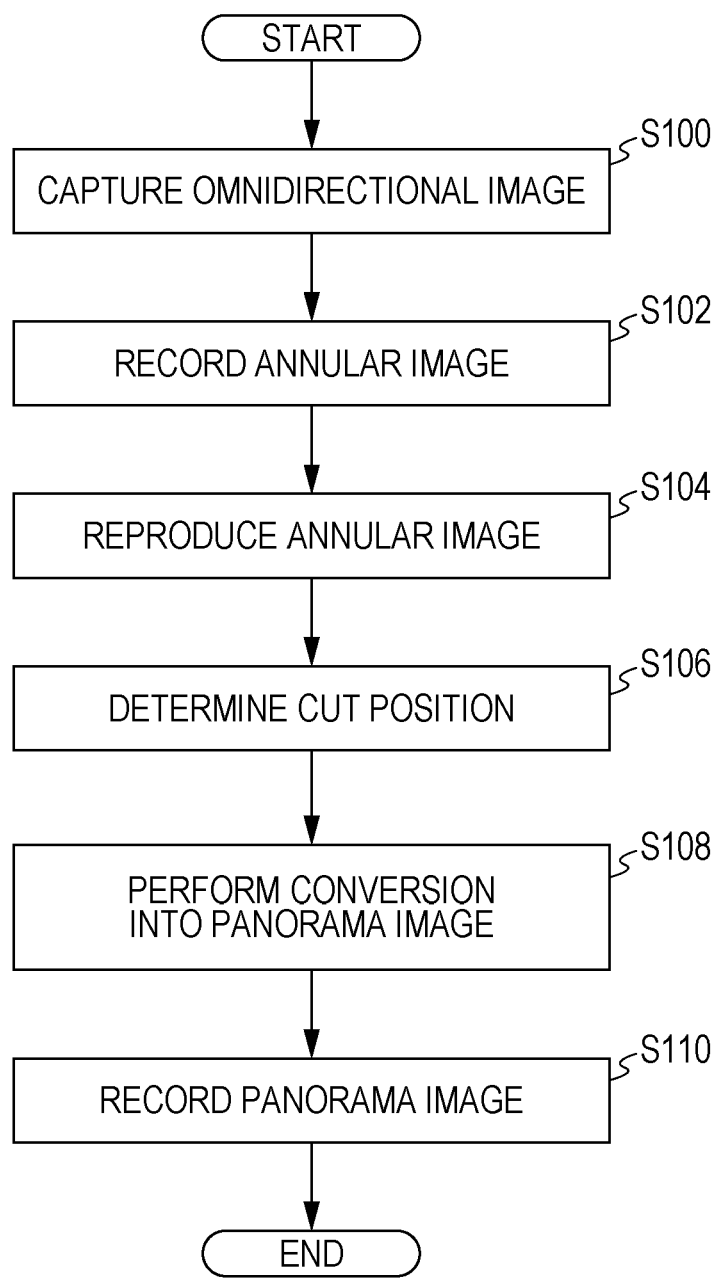

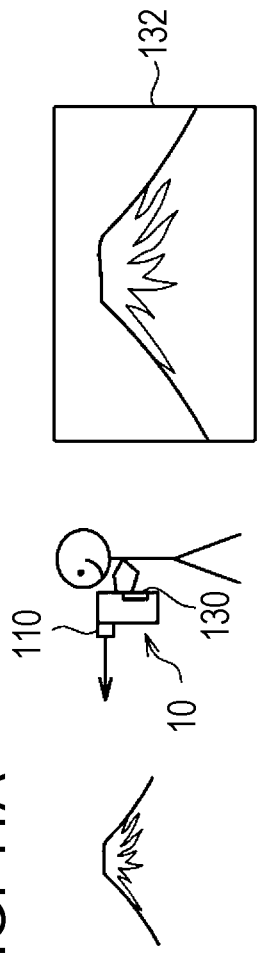
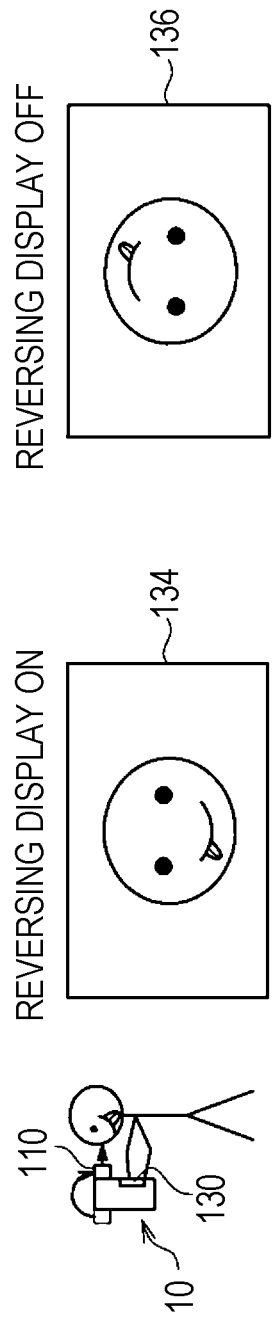
FIG. 11A
FIG. 11B

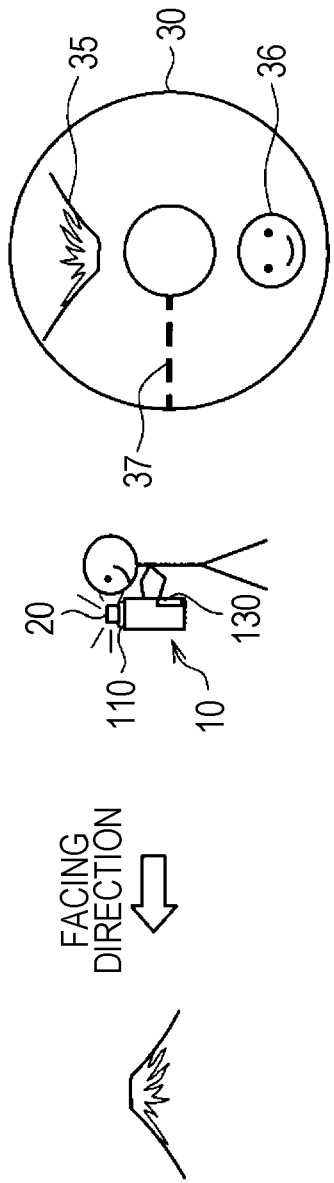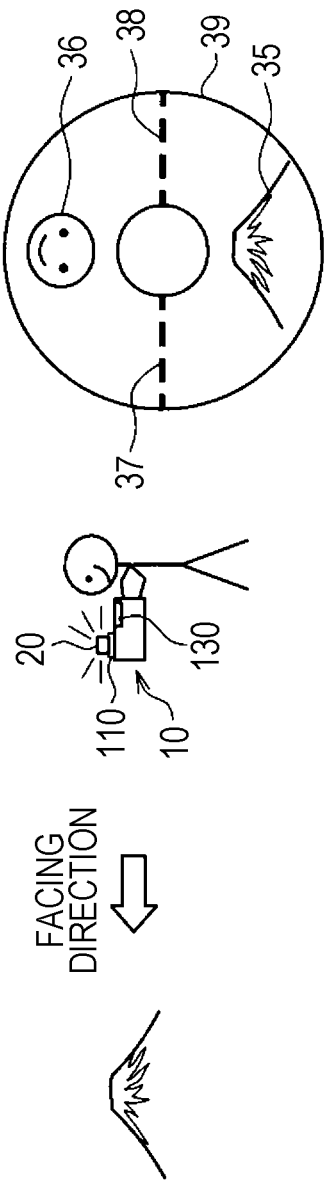

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program.

2. Description of the Related Art

There were suggested omnidirectional image capturing apparatuses capable of capturing an omnidirectional)(360°) subject using an omnidirectional image capturing optical system having a reflection surface with a rotationally symmetric shape (see Japanese Unexamined Patent Application Publication No. 59-192220 and Japanese Unexamined Patent Application Publication No. 2000-131738). The omnidirectional image capturing apparatuses condense an omnidirectional subject image incident on a reflection surface of an omnidirectional image capturing optical system and permit an image capturing element to pick up the subject image.

The omnidirectional image capturing apparatuses generate an annular image obtained by capturing the omnidirectional subject by the image capturing apparatuses (see Japanese Unexamined Patent Application Publication No. 2003-304532). The annular image is obtained by capturing a subject so that the shape of the subject is distorted in an annular shape by the optical characteristic of the omnidirectional image capturing optical system. Therefore, in order to view an image in a state where the distortion of the subject is corrected, the annular shape has to be converted into a long-rectangular-shaped panorama image by cutting and developing the annular image in a radial direction at a position, for example, as disclosed in Japanese Unexamined Patent Application Publication No. 2003-304532.

SUMMARY OF THE INVENTION

However, when the annular image is cut at an inappropriate position when converting the annular image into the panorama image, the continuity of the subject shown up in the annular image may be damaged. For example, an image capturing target subject which is in a facing direction of a photographer when capturing the annular image is inclined to be captured in the upper portion of the annular image, while the face or the like of the photographer is inclined to be captured in the lower portion of the annular image. When the upper portion or the lower portion of the annular image is cut when converting the annular image into the panorama image, the image capturing target subject or the photographer may be divided on the panorama image, thereby damaging the continuity of the subject.

It is desirable to provide a technique capable of not damaging the continuity of a subject when an annular image generated by an omnidirectional image capturing apparatus is developed into a panorama image.

According to an embodiment of the invention, there is provided an image processing apparatus including: a cut position determination unit determining a cut position at which an annular image is cut in a radial direction to maintain continuity of a subject in the annular image generated by an omnidirectional image capturing apparatus; and an image conversion unit converting the annular image into a long-rectangular-shaped panorama image by cutting the annular image at the cut position determined by the cut position determination unit and developing the cut annular image.

The cut position determination unit may determine the cut position on a left side or a right side of the annular image.

The cut position determination unit may determine the cut position based on image capturing state information indicating a state of the omnidirectional image capturing apparatus when the omnidirectional image capturing apparatus generates the annular image.

The image capturing state information may include information indicating a relative positional relationship between an image capturing direction of the omnidirectional image capturing apparatus when the omnidirectional image capturing apparatus generates the annular image and a display unit of the omnidirectional image capturing apparatus.

According to another embodiment of the invention, there is provided an image processing method including the steps of: determining a cut position at which an annular image is cut in a radial direction to maintain continuity of a subject in the annular image generated by an omnidirectional image capturing apparatus; and converting the annular image into a long-rectangular-shaped panorama image by cutting the annular image at the determined cut position and developing the cut annular image.

According to still another embodiment of the invention, there is provided a program causing a computer to execute the steps of: determining a cut position at which an annular image is cut in a radial direction to maintain continuity of a subject in the annular image generated by an omnidirectional image capturing apparatus; and converting the annular image into a long-rectangular-shaped panorama image by cutting the annular image at the determined cut position and developing the cut annular image.

With such a configuration, the cut position at which the annular image is cut in the radial direction is determined to maintain the continuity of the subject in the annular image generated by the omnidirectional image capturing apparatus. In addition, the annular image is converted into the long-rectangular-shaped panorama image by cutting the annular image at the determined cut position and developing the cut annular image. Accordingly, when the annular image is converted into the panorama image, the continuity of the subject in the annular image can be maintained.

According to the embodiments of the invention, the continuity of a subject is not damaged when an annular image generated by an omnidirectional image capturing apparatus is developed in to a panorama image.

BRIEF DESCRIPTION OF THE DRAWINGS

FIG. 7 is a schematic view illustrating the configuration of the image capturing apparatus according to the first embodiment.

FIG. 8 is an explanatory diagram illustrating an annular image and a panorama image according to a comparative example of the first embodiment.

FIG. 9 is an explanatory diagram illustrating an annular image and a panorama image according to the first embodiment FIG. 10 is a flowchart illustrating an image processing method according to the first embodiment.

FIGS. 11A and 11B are explanatory diagrams illustrating a reversing display function at normal image capturing time according to the first embodiment.

FIGS. 12A and 12B are explanatory diagrams illustrating the reversing display function when performing an omnidirectional image capturing operation according to the first embodiment.

DESCRIPTION OF THE PREFERRED EMBODIMENTS

Figure 1:
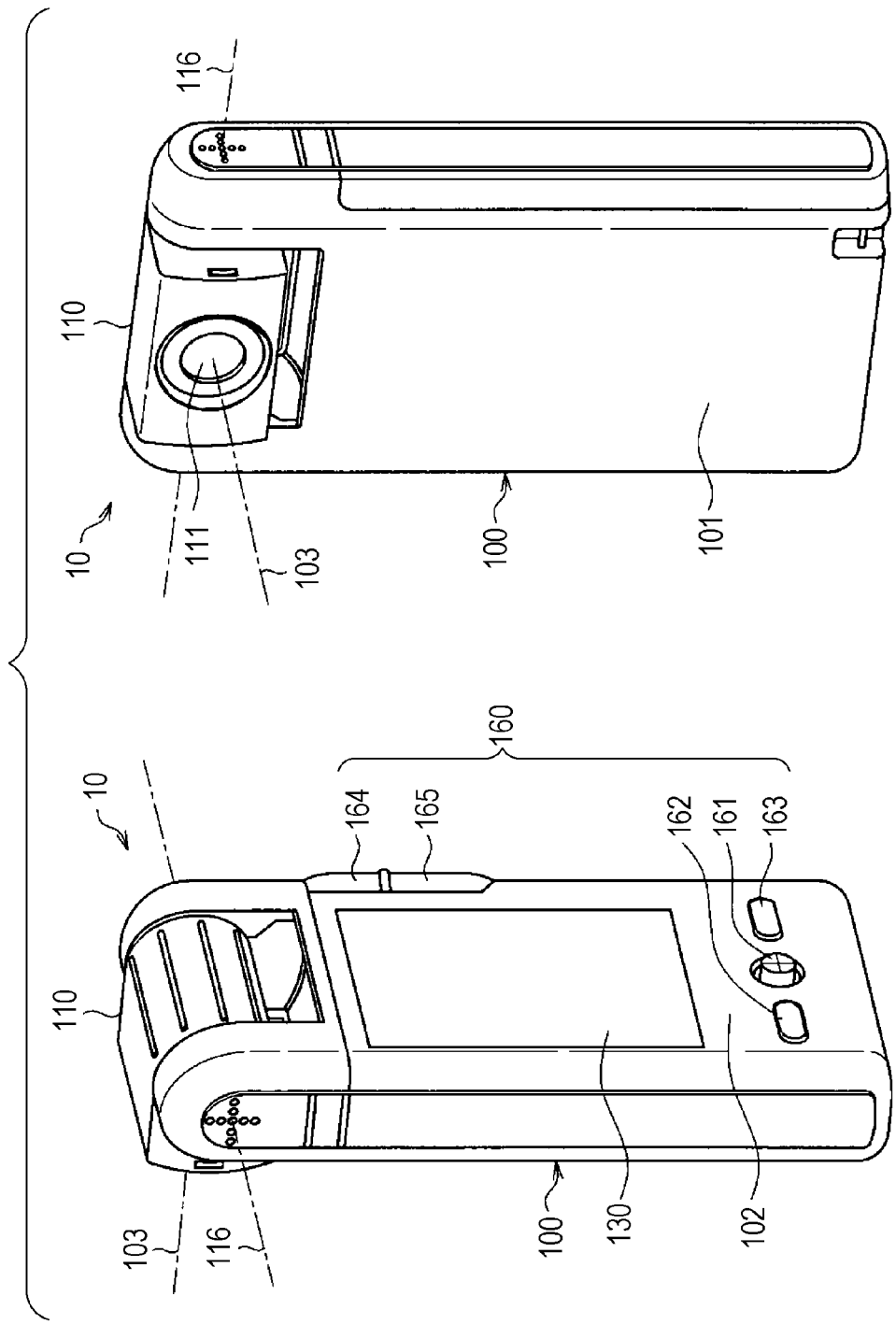
FIG. 1 is a perspective view illustrating the outer configuration of an image capturing apparatus according to a first embodiment of the invention.

Hereinafter, preferred embodiments of the invention will be described in detail with reference to the accompanying drawings. In the specification and the drawings, the same reference numerals are given to constituent elements having substantially the same functional configurations, and the repeated description will be omitted.

The description will be made in the following order.
1. First Embodiment
1.1 Outer Configuration of Image Capturing Apparatus
1.2 Configuration of Omnidirectional Image capturing optical system
1.3 Configuration of Image Capturing Apparatus
1.4 Configurations of Rotational Movement Detection Unit and Mounting Detection Unit
 1.5 Image Conversion Process
 1.6 Image Processing Method
2. Second Embodiment
2.1 Overview of Image Conversion Process
2.2 Example 1 in Which Cut Position Is Determined Based on Positional Relationship between Image Capturing Direction and Display Unit
2.3 Example 2 in Which Cut Position Is Determined Based on Positional Relationship between Image Capturing Direction and Display Unit
2.4 Example in Which Cut Position Is Determined Based on Positional Relationship between Image Capturing Direction and Handle
3. Summary
1. First Embodiment Hereinafter, an image processing apparatus and an image processing method according to a first embodiment of the invention will be described. An image capturing apparatus such as a digital camera will be described below as a realized example of the image processing apparatus. The image processing apparatus according to embodiments of the invention is not limited thereto, but is applicable to any electronic apparatus such as a personal computer.

1.1 Outer Configuration of Image Capturing Apparatus

First, an image capturing apparatus 10 according to the first embodiment of the invention will be described in detail with reference to FIGS. 1 to 5. FIGS. 1 to 5 are perspective views and a rear view illustrating the outer configuration of the image capturing apparatus 10 according to this embodiment.

Figure 2:
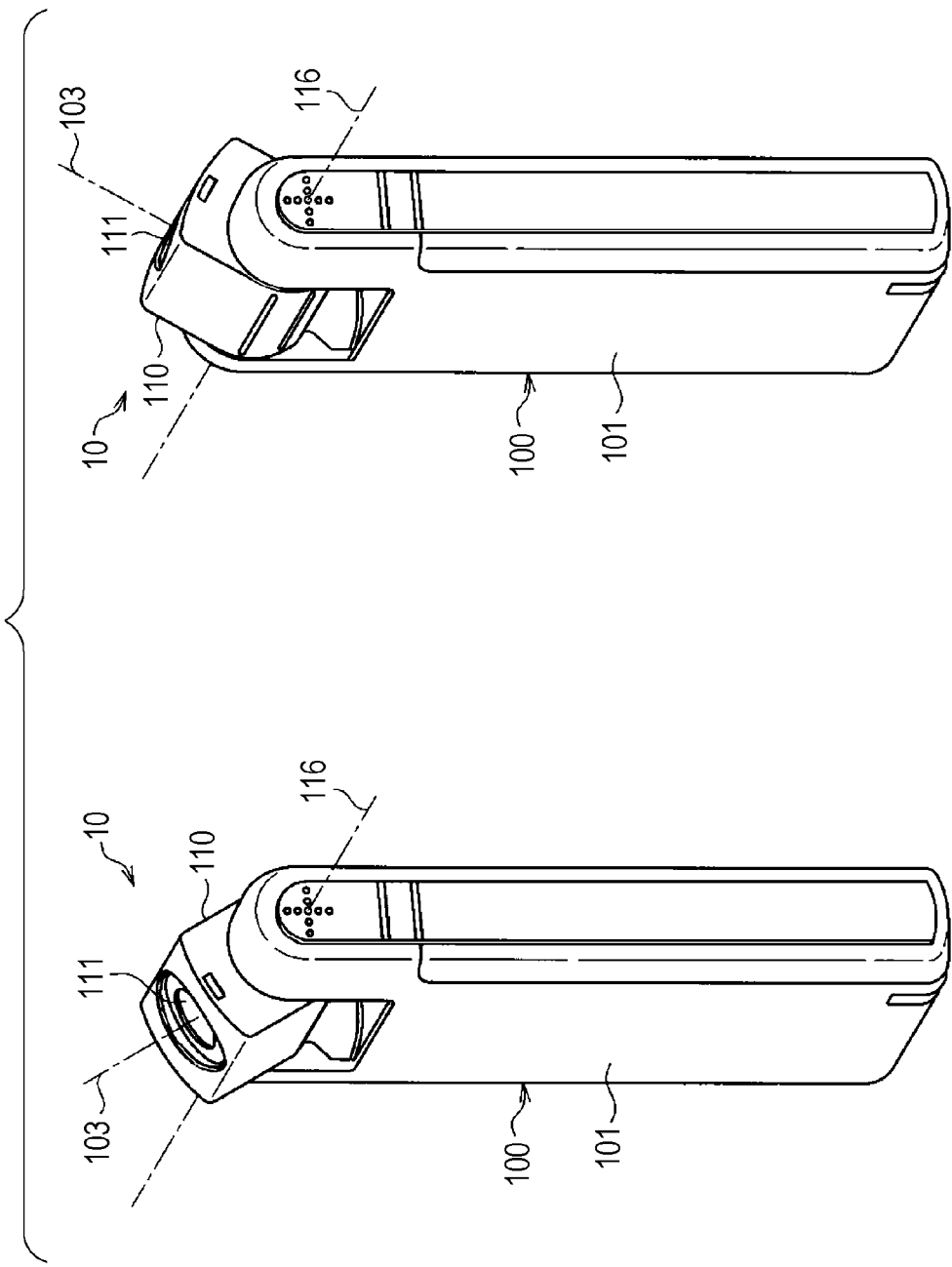
FIG. 2 is a perspective view illustrating the outer configuration of the image capturing apparatus according to the first embodiment.
Figure 3:
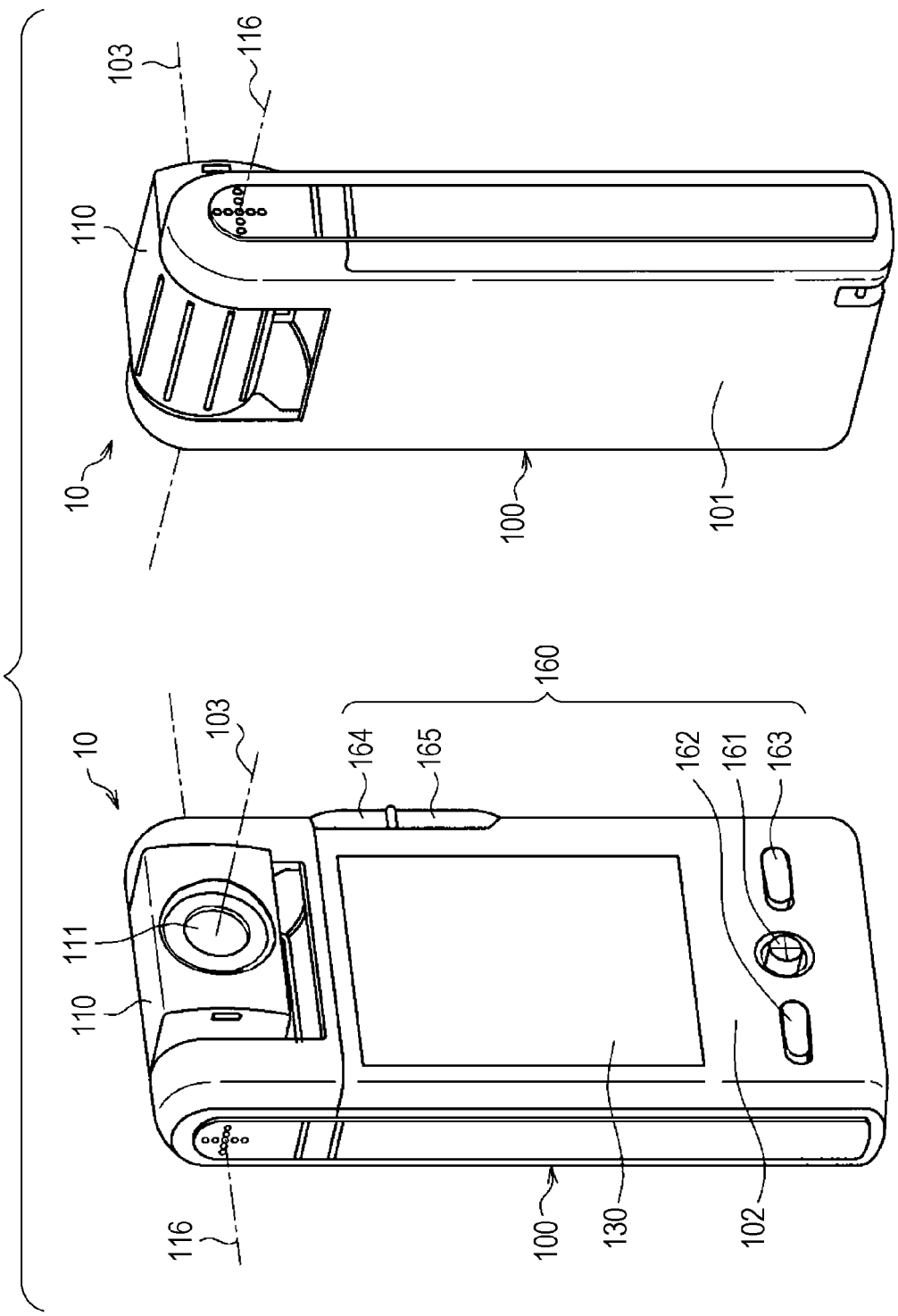
FIG. 3 is a perspective view illustrating the outer configuration of the image capturing apparatus according to the first embodiment of the invention.

As shown in FIGS. 1 to 3, the image capturing apparatus 10 according to this embodiment is configured as, for example, a digital camera (for example, a digital still camera or a digital video camera) capable of capturing a still image and/or a video. The image capturing apparatus 10 captures a subject and records a still image or a video obtained through the image capturing as digital image data in a recording medium. The image capturing apparatus 10 is configured as a compact apparatus with a vertically long shape so that it is convenient for a user to carry the image capturing apparatus and photograph an image.

The image capturing apparatus 10 according to this embodiment includes a main body 100 occupying the majority of the image capturing apparatus and an image capturing unit 110 rotatably installed in the upper end of the main body 100. The main body 100 has a control unit, a record unit, and a power supply unit of the image capturing apparatus 10 therein. A display unit 130 displaying a captured image and an operational unit 160 with which a user operates the image capturing apparatus 10 are disposed on a rear surface 102 of the main body 100. For example, the operational unit 160 includes an operation key 161 used for upper, lower, right, and left designation or a determination operation, a preview button 162, a menu button 163, a release button 164 used for capturing and recording a still image (photo), a record button 165 for starting and ending capturing and recording of a video, and a zoom switch 166 used for adjusting a zoom position between a Tele end and a Wide end.

The image capturing unit 110 has a function of capturing a subject and has an image capturing optical system 111 with optical components, such as a lens and a diaphragm, and an image capturing element 112 (see FIG. 7) in a housing of the image capturing unit 110. The image capturing unit 110 is disposed to be rotatable relative to the main body 100 by a rotation mechanism (not shown). A rotational axis 116 of the image capturing unit 110 is parallel to a display screen of the display unit 130 and is perpendicular to a vertical direction of the main body 100. By rotating the image capturing unit 110 about the rotational axis 116, the image capturing unit 110 can be oriented in directions of a front surface 101 and a rear surface 102 of the image capturing apparatus 10. The rotation state of the image capturing unit 110 is expressed as a rotational angle θ. The rotational angle θ refers to an angle formed between an optical axis 103 of the image capturing optical system 111 of the image capturing unit 110 and a direction (thickness direction of the main body 100) perpendicular to the display screen of the display unit 130. The front surface 101 of the image capturing apparatus 10 according to this embodiment is a surface opposite to a surface on which the display unit 130 is installed. The rear surface 102 of the image capturing apparatus 10 is the surface on which the display unit 130 is installed. The rotational direction of the image capturing unit 110 is not limited to the illustrated examples, but may be modified arbitrarily. The number of rotational axes is limited to the illustrated one axis, but plural rotational axes such as two axes or three axes may be used.

FIG. 1 shows a state where the rotational angle θ of the image capturing unit 110 is equal to 0°. When the optical axis 103 of the image capturing optical system 111 of the image capturing unit 110 is oriented in a direction (hereinafter, referred to as a front surface direction) of the front surface 101 of the image capturing apparatus 10 by rotating the image capturing unit 110, as shown in FIG. 1, a subject which is in the front surface direction of the image capturing apparatus 10 can be captured in the front surface direction as an image capturing direction. At this time, the user can adjust a viewing angle to photograph an image, while viewing a captured image (through-image) displayed on the display unit 130 on the rear surface 102 of the main body 100.

FIG. 2 shows a state of $0°<\theta<180°$. As shown in FIG. 2, the image capturing direction of the image capturing unit 110 can be changed in any direction (front surface direction, upper direction, rear surface direction, and the like) without changing the direction of the main body 100 by rotating the image capturing unit 110 relative to the main body 100.

FIG. 3 shows a state of $\theta=180°$. As shown in FIG. 3, the user can take a photograph of himself by orienting the optical axis 103 of the image capturing optical system 111 of the image capturing unit 110 in a direction (which is a direction facing the user and is referred to as a rear surface direction below) of the rear surface 102 of the image capturing apparatus 10 (self-image capturing function) by orienting the image capturing direction to the rear surface direction. At the time of self-image capturing, the user can photograph an image at a desired timing by adjusting the viewing angle while viewing the own face displayed on the display unit 130 on the rear surface 102 of the main body 100.

In the image capturing apparatus 10 according to this embodiment, the image capturing unit 110 is rotatable relative to the main body 100 and thus the image capturing direction can be freely changed. When the image capturing unit 110 is rotated toward the center of the main body 100 so that $\theta$ is equal to $-90°$, although not illustrated, the power of the image capturing apparatus 10 automatically turns off. On the other hand, when $\theta$ is larger than $-90°$, the power of the image capturing apparatus 10 automatically turns on.

Next, an adapter 20 detachably mounted on the image capturing apparatus 10 according to this embodiment will be described with reference to FIGS. 4 and 5.

Figure 4:
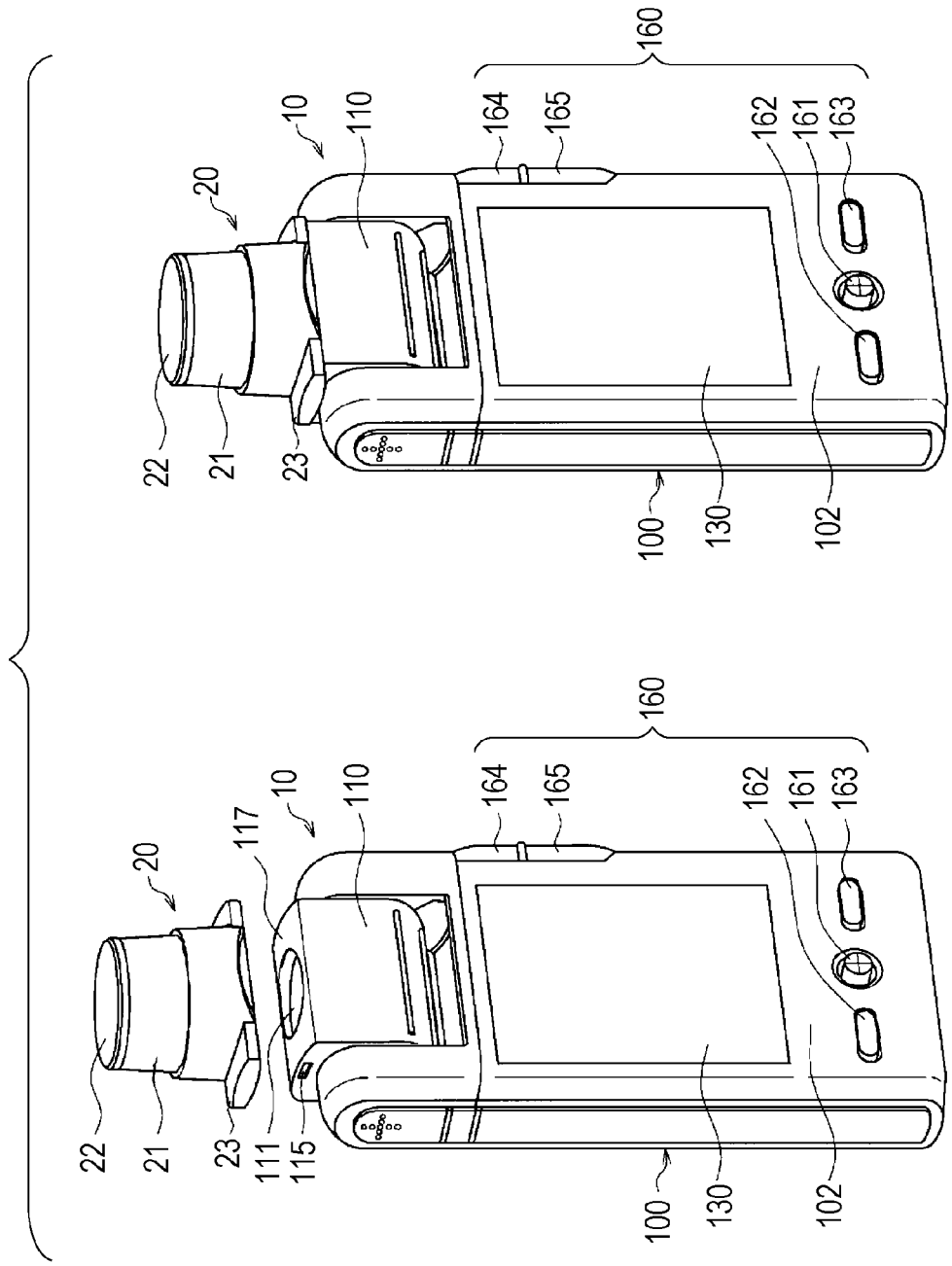
FIG. 4 is a perspective view illustrating the outer configurations of an adapter and the image capturing apparatus according to the first embodiment.
Figure 5:
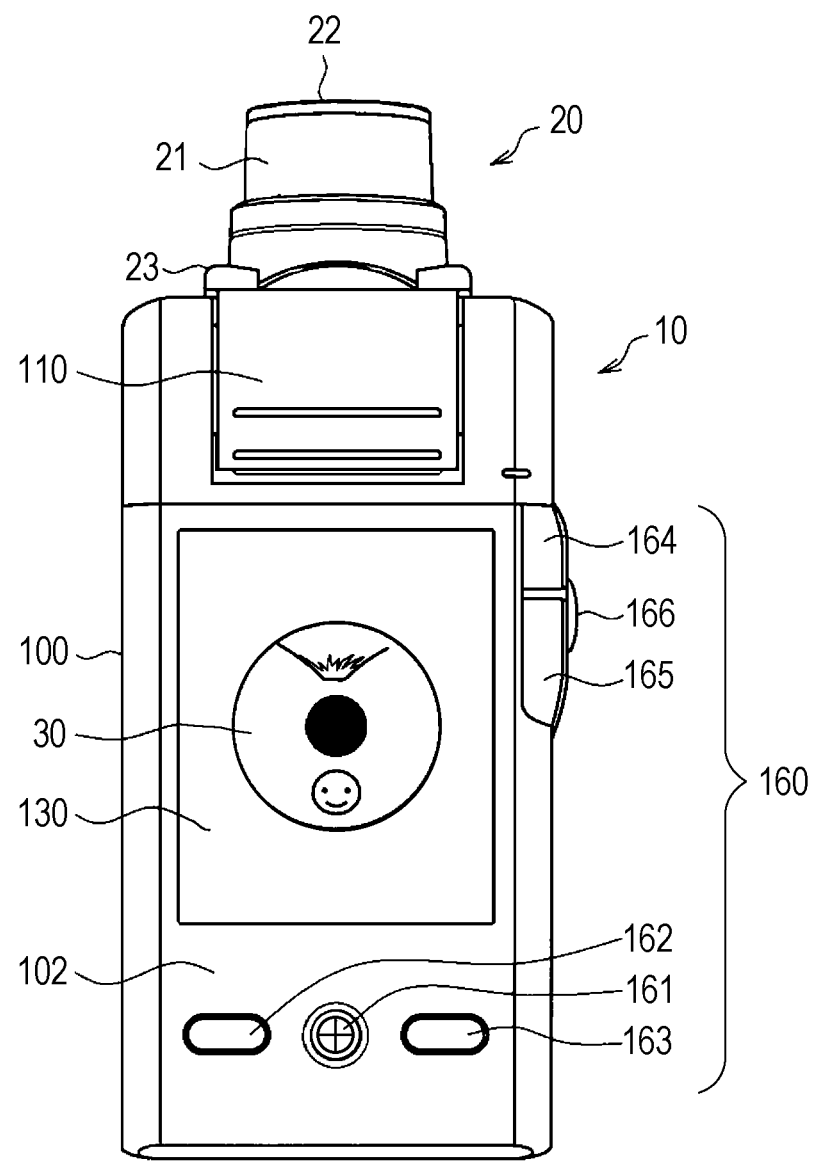
FIG. 5 is a rear view illustrating the image capturing apparatus mounted with the adapter according to the first embodiment.

In the image capturing apparatus 10 according to this embodiment, as shown in FIGS. 4 and 5, the removable adapter 20 can be mounted as an omnidirectional image capturing attachment on the image capturing unit 110. The adapter 20 includes an omnidirectional image capturing optical system 21 (see FIGS. 6 and 7) capturing an omnidirectional subject, a cylindrical cover 22 covering the omnidirectional image capturing optical system 21, and a fitting portion 23 mounting the adapter 20 on the image capturing apparatus 10. The fitting portion 23 has a form so as to be able to fit in an attachment portion 117 disposed on the front surface of a housing of the image capturing unit 110. By fitting two locking claws 24 (see FIG. 7) protruding inward from both ends of the fitting portion 23 into recessed portions 115 formed in both side surfaces of the attachment portion 117 of the image capturing unit 110, the adapter 20 can be mounted on and fixed to the image capturing unit 110.

As shown in FIGS. 4 and 5, by mounting the adapter 20 including the omnidirectional image capturing optical system 21 on the image capturing unit 110, an omnidirectional image capturing operation can be realized using the general image capturing device 10 including no omnidirectional image capturing optical system. The omnidirectional image capturing operation is an operation of capturing a subject which is in the omni-directions (0° to 360°) of the image capturing apparatus 10. When the adapter 20 is mounted on the image capturing unit 110, an omnidirectional subject image collected by the omnidirectional image capturing optical system 21 of the adapter 20 is incident on the image capturing optical system 111 of the image capturing unit 110 and is formed on the image capturing element 112.

When the adapter 20 is mounted, both the omnidirectional image capturing optical system 21 of the adapter 20 and the image capturing optical system 111 of the image capturing unit 110 are used for the image capturing device 10 to capture an image of an omnidirectional (all-directional) subject. By capturing the omnidirectional subject image using the omnidirectional image capturing optical system 21, as shown in FIG. 5, an annular image 30 can be obtained by capturing the omnidirectional subject by the image capturing apparatus 10 and thus the annular image 30 is displayed as a through-image on the display unit 130.

In the examples of FIGS. 4 and 5, the adapter 20 is mounted in a state where the image capturing unit 110 faces directly upward ($\theta=90°$). In this case, a user can photograph the omnidirectional subject present at 360° with respect to a horizontal plane around the user, holding the image capturing apparatus 10 so that the display unit 130 of the main body 100 is nearly parallel to a vertical direction. In the state where the adapter 20 is mounted, the image capturing unit 110 is rotatable relative to the main body 100 up to any rotational angle $\theta$ (see FIGS. 1 to 3). For example, the image capturing unit 110 mounted with the adapter 20 may be rotated up to a rotational angle ($\theta=180°$) shown in FIG. 3, and the image capturing apparatus 10 may be put on a desk in a state where the display unit 130 faces upward. For example, a scene where several people sit down around the desk and are holding a meeting can be appropriately captured in the omnidirectional manner by the image capturing apparatus 10.

On the other hand, when the adapter 20 is not mounted on the image capturing unit 110 (see FIGS. 1 to 3), the image capturing apparatus 10 executes a normal image capturing operation using only the typical image capturing optical system 111 built in as an optical system. The normal image capturing operation is an operation of capturing a subject which is in one specific direction (image capturing direction oriented toward the optical axis 103 of the image capturing optical system 111) in a view from the image capturing apparatus 10 using only the typical image capturing optical system 111. In the normal image capturing operation, the image of the unidirectional subject is incident through the typical image capturing optical system 111 included generally in the image capturing apparatus 10 and is formed on the image capturing element 112.

The adapter 20 according to this embodiment is configured to be detachably mounted on the image capturing unit 110 of the image capturing apparatus 10. Accordingly, by just mounting the adapter 20 on the image capturing unit 110, the user can simply realize the omnidirectional image capturing operation using the normal image capturing apparatus 10.

1.2 Configuration of Omnidirectional Image Capturing Optical System

Figure 6:
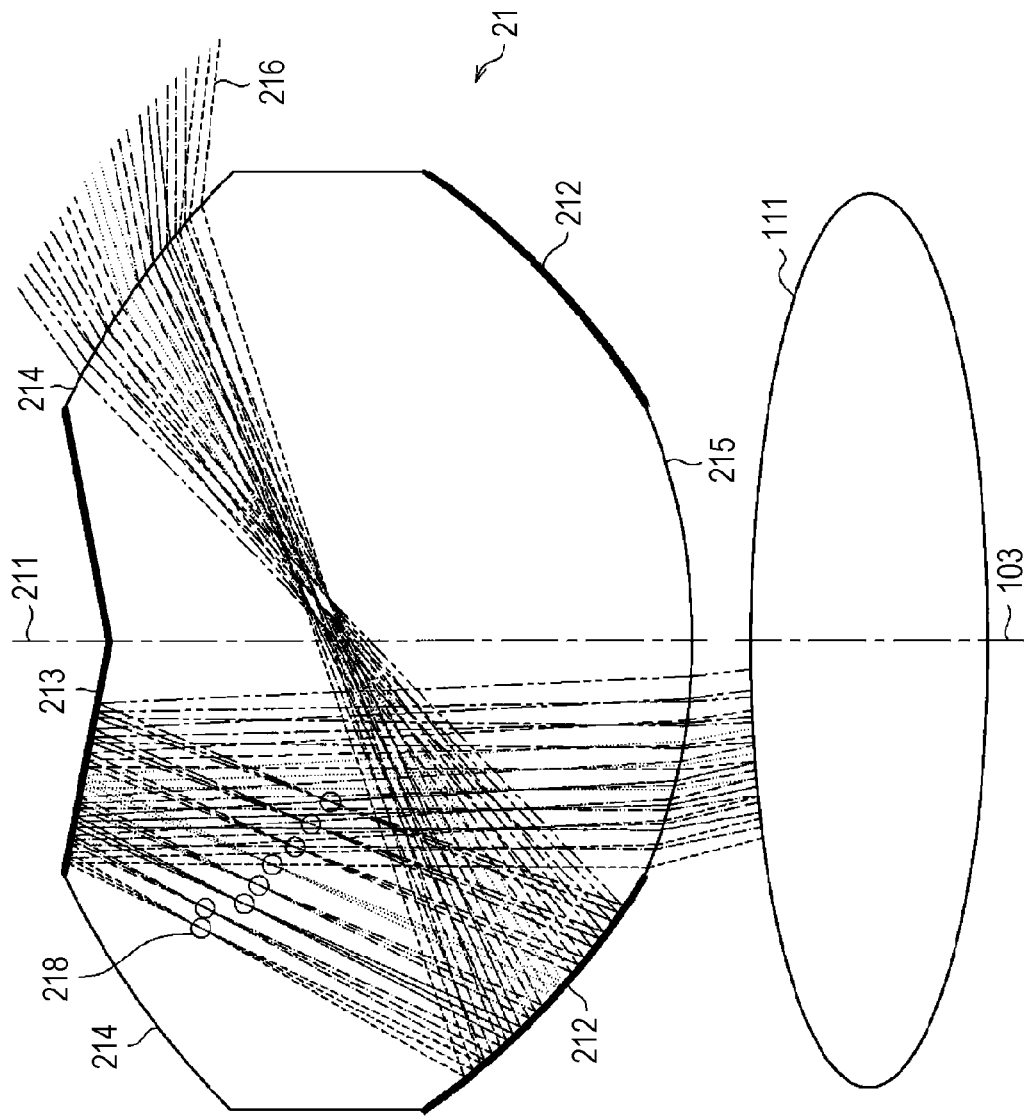
FIG. 6 is a sectional view illustrating a twice-reflection type omnidirectional image capturing optical system according to the first embodiment.

Next, an exemplary configuration of the omnidirectional image capturing optical system 21 of the adapter 20 according to this embodiment will be described with reference to FIG. 6. FIG. 6 is a sectional view illustrating the twice-reflection type omnidirectional image capturing optical system 21 according to this embodiment.

As shown in FIG. 6, the omnidirectional image capturing optical system 21 (omnidirectional image capturing lens) includes a convex mirror and a concave mirror having a rotationally symmetric shape with respect to a central axis 211. The central axis 211 is formed collinearly with the optical axis 103 of the image capturing optical system 111 of the image capturing unit 110. The omnidirectional image capturing optical system 21 includes a first reflection surface 212 having an annular shape and formed in the lower portion thereof, a second reflection surface 213 having a conical shape and facing the first reflection surface 212, an annular light-entering portion 214 formed in the outer circumference of the second reflection surface 213, and a light-exiting portion 215 formed in the inner circumference of the first reflection surface 212. The first reflection surface 212 is formed of a mirror-finished annular concave mirror and the second reflection surface 213 is formed of a mirror-finished convex mirror. The light-entering portion 214 and the light-exiting portion 215 are formed of a transparent glass plate and allow light to pass. In the twice-reflection type omnidirectional image capturing optical system 21, the optical characteristic of the omnidirectional image capturing optical system 21 is designed so that all the foci 218 of the subjects distant in an arbitrary distance from the omnidirectional image capturing optical system 21 are located between the first reflection surface 212 and the second reflection surface 213.

In the omnidirectional image capturing optical system 21 with the above configuration, incident light 216 is incident from the light-entering portion 214, is reflected by the first reflection surface 212, is reflected by the second reflection surface 213, and then exits from the light-exiting portion 215. The light exiting from the light-exiting portion 215 is incident on the image capturing optical system 111 of the image capturing unit 110 and is projected on the image capturing element 112. The omnidirectional image capturing optical system 21 having the above configuration can display a subject image in the range of 360° about the central axis 211. Accordingly, the omnidirectional image capturing optical system 21 can collect the omnidirectional (360°) subject image around the omnidirectional image capturing optical system and guide the subject image to the image capturing optical system 111.

In FIG. 6, the twice-reflection type omnidirectional image capturing optical system 21 is exemplified, but a once-reflection type omnidirectional image capturing optical system may be used. The once-reflection type omnidirectional image capturing optical system (not shown) includes only one reflection surface to reflect light from an omnidirectional subject. Therefore, the reflection surface is configured as a convex mirror with a rotationally symmetric shape with respect to a central axis and is disposed so that light reflected from the reflection surface goes toward the image capturing optical system 102 of the image capturing apparatus 10.

1.3 Configuration of Image Capturing Apparatus

Next, the configuration of the image capturing apparatus 10 according to this embodiment will be described in detail with reference to FIG. 7. FIG. 7 is a schematic view illustrating the hardware configuration of the image capturing apparatus 10 according to this embodiment.

As shown in FIG. 7, the image capturing apparatus 10 according to this embodiment generally includes the image capturing unit 110, a DSP (Digital Signal Processor) 120, the display unit 130, and the operational unit 160. The DSP 120 functions as a signal processing unit 122, a record reproduction unit 140, a control unit 150, a cut position determination unit 190, and an image conversion unit 192.

The image capturing unit 110 has a function of capturing a subject and outputting the captured image. The image capturing unit 110 includes the image capturing optical system 111, the image capturing element 112, a timing generator 113, and an optical component driving unit 114.

The image capturing optical system 111 is a general optical system optically designed to capture a unidirectional subject. The image capturing optical system 111 includes various lenses such as a focus lens and a zoom lens, an optical filter removing an unnecessary wavelength, and optical components such as a diaphragm. An optical image (subject image) incident from the subject is formed on an exposure surface of the image capturing element 112 via the various optical components of the image capturing optical system 111. The image capturing element 112 (image sensor) is formed by a solid state imaging element such as a CCD (Charge Coupled device), or a CMOS (Complementary Metal Oxide Semiconductor). The image capturing element 112 photoelectrically converts the optical image guided from the image capturing optical system 111 and outputs an electric signal (analog image signal) indicating the captured image.

The optical component driving unit 114 driving the optical components of the image capturing optical system 111 is mechanically connected to the image capturing optical system 111. For example, the optical component driving unit 114, which includes the zoom motor 114a and a focus motor 114b, moves the zoom lens and the focus lens or adjusts the diaphragm. The optical component driving unit 114 drives the optical components of the image capturing optical system 111 in accordance with an instruction of the control unit 150 described below. The TG (Timing Generator) 113 generates operational pulses necessary for the image capturing element 112 in accordance with an instruction of the control unit 150. For example, the TG 113 generates various kinds of pulses such as a quadratic-phase pulse and a field shift pulse used for vertical transmission and a bi-phase pulse and a shutter pulse used for horizontal transmission, and supplies the various kinds of pulses to the image capturing element 112. By permitting the TG 113 to drive the image capturing element 112, a subject image is captured. By permitting the TG 113 to adjust a shutter speed of the image capturing element 112, an exposure amount or an exposure time of the captured image is controlled (electronic shutter function).

The DSP (Digital Signal Processor) 120 is an arithmetic processing unit that processes the captured image or controls the operation of the image capturing apparatus 10. The DSP 120 includes a signal processing unit 122. An image signal output from the image capturing element 112 is input to the signal processing unit 122 of the DSP 120. The signal processing unit 122 performs predetermined signal processing on the image signal of the captured image output from the image capturing element 112 and outputs the image signal subjected to the predetermined signal processing to the display unit 130 or the record reproduction unit 140. For example, the signal processing unit 122 includes an analog signal processing unit, an A/D conversion unit, and a digital signal processing unit (none of which are shown).

The analog signal processing unit is a so-called analog front end that performs preprocessing on the image signal. For example, the analog signal processing unit performs CDS (Correlated Double Sampling) processing, gain processing by a programmable gain amplifier (PGA), or the like on the image signal output from the image capturing element 112. The A/D conversion unit converts the analog image signal input from the analog signal processing unit into a digital image signal, and outputs the digital image signal to the digital signal processing unit. The digital signal processing unit performs digital signal processing such as noise removal, white balance adjustment, color correction, edge enhancement, or gamma correction on the input digital image signal and outputs the processed digital image signal to the display unit 130 and the record reproduction unit 140. Here, the analog signal processing and digital signal processing performed by the signal processing unit 122 have been described, but the invention is not limited thereto. For example, the image capturing element 112 may output a digital image signal and the signal processing unit 122 may perform only digital signal processing.

For example, the display unit 130 includes a liquid crystal display (LCD) or an organic EL display. The display unit 130 displays various kinds of input image data under the control of the control unit 150. For example, the display unit 130 displays a captured image (through-image) which is being captured and is input in real time from the signal processing unit 122 during the image capturing. Then, a user can operate the image capturing apparatus 10 while viewing the image being captured on the display unit 130. When the captured image recorded in the memory card 167 is reproduced by the record reproduction unit 140, the display unit 130 displays the reproduced image input from the record reproduction unit 140. Accordingly, the user can confirm the details of the captured image recorded in the memory card 167.

The record reproduction unit 140 records various kinds of data such as data of the captured image or metadata of the captured image in a recording medium such as the memory card 167 and reproduces the data recorded in the recording medium. In the example of FIG. 7, the memory card 167 detachably mounted on the image capturing apparatus 10 is illustrated as the recording medium. However, a disk-shaped recording medium such as a semiconductor memory, an optical disk, or a hard disk may be used as the recording medium. For example, the optical disk may be a Blu-ray disc, a DVD (Digital Versatile Disc), or a CD (Compact Disc). The recording medium may be included inside the image capturing apparatus 10 or may be a removable medium detachably mounted on the image capturing apparatus 10.

The control unit 150 is configured as an arithmetic processing unit such as a microcontroller installed in the DSP 120 and controls the operation of the image capturing apparatus 10 as a whole. The control unit 150 performs a control function using, for example, a DRAM (Dynamic Random Access Memory) 152 or a flash ROM (Read-Only Memory) 154.

The flash ROM 154 stores programs executing various kinds of control processes of the control unit 150. The control unit 150 operates in accordance with the programs and executes an arithmetic control process necessary for each control while using the DRAM 152. The programs may be stored in advance in a memory unit (for example, the flash ROM 154) included inside the image capturing apparatus 10. The programs may be stored in a removable recording medium such as a disk-shaped recording medium or a memory card to be supplied to the image capturing apparatus 10 or may be downloaded to the image capturing apparatus 10 via a network such as a LAN or the Internet.

Hereinafter, a specific control example of the control unit 150 will be described. The control unit 150 controls the TG 113 or the optical component driving unit 114 of the image capturing unit 110 to control the image capturing operation of the image capturing unit 110. For example, the control unit 150 performs automatic exposure control by adjusting the diaphragm of the image capturing optical system 111, by setting the electronic shutter speed of the image capturing element 112, by setting the gain of the AGC of the signal processing unit 122, or the like (AE function). The control unit 150 performs automatic focus control to automatically adjust the focus of the image capturing optical system 111 for a specific subject by moving the focus lens of the image capturing optical system 111. The control unit 150 adjusts the viewing angle of a captured image by moving the zoom lens of the image capturing optical system 111 (AF function). The control unit 150 controls a record and reproduction process performed on the data of the captured image by the record reproduction unit 140. The control unit 150 controls the display of the various kinds of display data on the display unit 130.

The operational unit 160 functions as a user interface operating the image capturing apparatus 10. For example, the operational unit 160 includes various kinds of operational buttons, a touch panel, and a remote controller installed on the exterior part of the image capturing apparatus 10. The operational unit 160 outputs an instruction signal to the control unit 150 in response to the operation of the user. For example, the operational unit 160 includes the operation key 161, the preview button 162, the menu button 163, the release button 164, the record button 165, and the zoom switch 166 shown in FIGS. 1 to 5.

Next, the operation of the image capturing apparatus 10 with the above-described configuration will be described. The control unit 150 controls the units of the image capturing apparatus 10 by executing the program recorded in the flash ROM 154. Then, the various kinds of operations of the image capturing apparatus 10 are executed as described below.

(1) Automatic Focus (AF) Control

When the subject image is incident on the image capturing element 112 via the image capturing optical system 111, the image capturing element 112 captures a subject image within an image capturing range. That is, the image capturing element 112 photoelectrically converts an optical image formed on the image capturing surface by the image capturing optical system 111 and outputs an analog image signal indicating the captured image. When the image is captured, the control unit 150 calculates a focus position where the focus of the image capturing optical system 111 is focused on a specific subject within a predetermined AF detection range of the captured image by processing the image signal within the AF detection range, and gives an instruction to the optical component driving unit 114. The optical component driving unit 114 automatically focuses the focus of the image capturing optical system 111 on the specific subject by driving the focus motor 114b and moving the focus lens based on the instruction of the control unit 150.

(2) Automatic Exposure (AE) Control

When the image is captured, the control unit 150 calculates an exposure amount suitable for the captured image during the image capturing based on the signal level of the image signal within the predetermined AE detection range of the captured image, and gives an instruction to the optical component driving unit 114 or the TG 113. The optical component driving unit 114 adjusts the exposure amount of the subject image incident on the image capturing element 112 by adjusting the degree to which the diaphragm of the capturing optical system 111 is opened based on the instruction of the control unit 150. The TG 113 supplies a timing signal to the image capturing element 112 based on the instruction of the control unit 150, and thus the shutter speed of the image capturing element 112 is controlled by the timing signal. As a consequence, the exposure of the captured image is automatically controlled so that the appropriate lightness of the captured image is obtained.

(3) Image Signal Processing

The signal processing unit 122 performs analog signal processing (amplification or the like) on the analog image signal output from the image capturing element 112 under the control of the control unit 150, and then performs A/D conversion to convert the analog image signal into the digital image signal. The signal processing unit 122 performs digital signal processing such as noise removal, white balance adjustment, color correction, edge enhancement, or gamma correction on the digital image signal under the control of the control unit 150.

(4) Captured Image Displaying Process

When the signal processing unit 122 outputs the processed image signal to the display unit 130, the display unit 130 displays the captured image (through-image) indicated by the image signal during the image capturing under the control of the control unit 150. When the through-image (moving image) is displayed, the user can view the image capturing direction, the viewing angle, the captured state of the subject, and the like and can record the captured image of the desired subject at a desired shutter opportunity. The display unit 130 also displays an image obtained by reproducing the image data recorded in the recording medium under the control of the control unit 150.

(5) Recording Process

The record reproduction unit 140 performs a compression record process on the captured image under the control of the control unit 150. For example, when the record button 165 is pressed down in a moving-image capturing mode, the record reproduction unit 140 compresses the image signal indicating the captured image (moving image) in accordance with a predetermined compression coding method such as JPEG (Joint Photographic Experts Group). The record reproduction unit 140 records the compressed image signal as moving-image data in the recording medium. When the release button 164 is pressed down in a still image capturing mode, the record reproduction unit 140 compresses the image signal indicating the captured image (still image) in accordance with the predetermined compression coding method in response to a release signal from the release button 164, and records the compressed image signal in the recording medium as still image data.

(6) Reproduction Process

The record reproduction unit 140 reproduces the image recorded in the recording medium such as the memory card 167 under the control of the control unit 150. When a reproduction instruction is input from the operational unit 160 in a reproduction mode, the record reproduction unit 140 decompresses the compressed image data recorded in the recording medium and outputs the obtained reproduction image signal to display the reproduction image signal on the display unit 130.

(7) Various Setting Processes

The image capturing apparatus 10 sets the various functions of the image capturing apparatus 10 or the operations of the image capturing apparatus 10 based on outside environments detected by various sensors or the user operation of the operational unit 160. Exemplary functions of the image capturing apparatus 10 include a zoom function, an AF function, an AE function, a flash function, a self-timer function, a continuous shooting image capturing function, a function of adjusting the image quality or the image size of a captured image, shutter speed, white balance, or the like, an image capturing auxiliary function, and a display function.

1.4 Configurations of Rotational Movement Detection Unit and Mounting Detection Unit Next, a rotation detection unit 170 detecting the rotation state of the image capturing unit 110 according to this embodiment will be described with reference to FIG. 7.

As shown in FIG. 7, most units, such as the DSP 120, the display unit 130, the operational unit 160, and a power supply unit (not shown), of the image capturing apparatus 10 are installed in the housing of the main body 100 of the image capturing apparatus 10. On the other hand, the image capturing unit 110 is disposed in the main body 100 to be rotatable about the rotational axis 116 (see FIGS. 1 to 3).

The image capturing apparatus 10 according to this embodiment includes the rotation detection unit 170 that detects a rotation state such as the rotational angle $\theta$ of the image capturing unit 110 with respect to the main body 100. For example, the rotation detection unit 170 includes a rotation state detection hall sensor 172 disposed in the main body 100 and a magnet 174 disposed in the image capturing unit 110.

The rotation state detection hall sensor 172 is present in the upper end of the main body 100 and is disposed at a position adjacent to the image capturing unit 110. The hall sensor 172 detects a magnetic flux density of a magnetic field generated by the magnet 174 disposed in the image capturing unit 110. On the other hand, the magnet 174 is disposed at a position deviated from the rotation axis 116 of the image capturing unit 110.

With such a configuration, when the image capturing unit 110 rotates about the rotation axis 116, a relative position between the hall sensor 172 and the magnet 174 is changed and thus the size or the direction of the magnetic field of the magnet 174 detected by the hall sensor 172 is also changed. Therefore, by detecting the size or the direction of the magnetic field of the magnet 174 by the hall sensor 172, the rotational state (for example, the rotational angle $\theta$, the relative position, or the like of the image capturing unit 110) of the image capturing unit 110 with respect to the main body 100 can be detected. The hall sensor 172 outputs a signal indicating the size or the direction of the detected magnetic field to the control unit 150, and the control unit 150 determines the rotation state of the image capturing unit 110 based on the size or the direction of the magnetic field. The control unit 150 controls the reversing display function of determining and displaying the upper, lower, right, and left of the captured image on the display unit 130 in response to the rotation state of the detected image capturing unit 110. A detailed description will be made below.

Next, a mounting detection unit 180 detecting whether the adapter 20 is mounted on the image capturing unit 110 according to this embodiment (hereinafter, also referred to as "mounting or non-mounting of the adapter 20 on the image capturing unit 110") will be described with reference to FIG. 7.

In this embodiment, as described above, the adapter 20 performing the omnidirectional image capturing operation can be detachably mounted on the image capturing unit 110 of the image capturing apparatus 10 (see FIG. 4). As shown in FIG. 7, the adapter 20 is detachably mounted on the image capturing unit 110 by fitting the fitting portion 23 of the adapter 20 into the attachment portion 117 disposed on the front surface of the image capturing unit 110 in the image capturing direction. At this time, the adapter 20 can be simply fixed to the front surface of the image capturing unit 110 by fitting the two locking claws 24 protruding inward from both ends of the fitting portion 23 of the adapter 20 into the recessed portions 115 formed on the both side surfaces of the housing of the image capturing unit 110.

The image capturing apparatus 10 according to this embodiment includes the mounting detection unit 180 detecting whether the adapter 20 is mounted on the image capturing unit 110. For example, as shown in FIG. 7, the mounting detection unit 180 includes a mounting detection hall sensor 182 disposed in the image capturing unit 110 of the image capturing apparatus 10 and a magnet 184 disposed in the adapter 20. The magnet 184 is buried on one side of the fitting portion 23 of the adapter 20. The mounting detection hall sensor 182 is present on the front surface (front side in the image capturing direction) of the image capturing unit 110 and is disposed at a position adjacent to the magnet 184 of the adapter 20. The hall sensor 182 detects a magnetic flux density of a magnetic field generated by the magnet 184 disposed in the adapter 20.

When the adapter 20 is mounted on the image capturing unit 110 in the above-described configuration (see FIG. 4), the magnet 184 is disposed near the hall sensor 182. Therefore, the hall sensor 182 detects a magnet field with a density equal to or larger than a predetermined magnet flux density from the magnet 184. On the other hand, when no adapter 20 is mounted (see FIG. 4), the hall sensor 182 does not detect the magnet field with a density equal to or larger than the predetermined magnet flux density from the magnet 184 of the adapter 20. Accordingly, by using the magnitude of the detected magnetic field by the hall sensor 182, it is possible to detect whether the adapter 20 is mounted on the image capturing unit 110. The hall sensor 172 outputs a signal indicating the magnitude of the detected magnetic field to the control unit 150, and the control unit 150 determines whether the adapter 20 is mounted on the image capturing unit 110 (mounting or non-mounting of the adapter 20) based on the magnitude of the magnetic field. The control unit 150 changes various kinds of operation settings of the image capturing apparatus 10 depending on the mounting or non-mounting of the adapter 20.

In the image capturing apparatus 10 according to this embodiment, the rotation detection unit 170 detects the state where the image capturing unit 110 is rotated relative to the main body 100 of the image capturing apparatus 10 and the mounting detection unit 180 detects the mounting or non-mounting of the adapter 20 on the image capturing unit 110. In this way, the control unit 150 can control the operation setting of the image capturing apparatus 10 based on the rotation state of the image capturing unit 110 or the mounting or non-mounting of the adapter 20. Examples of the operation setting of the image capturing apparatus 10 include setting of the image capturing operation of the image capturing unit 110 (for example, setting of an image capturing parameter associated with the image capturing operation), setting of the display operation of the display unit 130, and control setting of the user operation of the operational unit 160.

Based on the mounting or non-mounting of the adapter 20, the control unit 150 changes various kinds of operation settings of the image capturing apparatus 10 depending on the optical characteristics of the omnidirectional image capturing optical system 21. In this way, when the adapter 20 is mounted on the image capturing unit 110 of the image capturing apparatus 10 to perform the omnidirectional image capturing operation, the operation settings of the image capturing apparatus 10 can be changed automatically into setting suitable for the optical characteristics of the omnidirectional image capturing optical system 21. Accordingly, by simply mounting the adapter 20 on the image capturing apparatus 10 without a specific setting operation of a user on the image capturing apparatus 10, the image capturing apparatus 10 is automatically controlled to an optimum operation setting suitable for the omnidirectional image capturing operation.

1.5 Image Conversion Process

Next, an image conversion process of converting the annular image 30 into a panorama image 40 by the image capturing apparatus 10 according to this embodiment will be described with reference to FIGS. 7 to 9. FIG. 8 is an explanatory diagram illustrating the annular image 30 and the panorama image 40 according to a comparative example of this embodiment. FIG. 9 is an explanatory diagram illustrating the annular image 30 and the panorama image 40 according to this embodiment.

As shown in FIG. 7, the DSP 120 of the image capturing apparatus 10 functions as the cut position determination unit 190 and the image conversion unit 192 when the DSP 120 operates in accordance with the program stored in the flash ROM 151. In this embodiment, the cut position determination unit 190 and the image conversion unit 192 are realized by software, but may be realized by dedicated hardware.

First, the overview of the image conversion process will be described. By mounting the adapter 20 on the image capturing apparatus 10 to perform the omnidirectional image capturing operation, as shown in FIG. 5, the annular image 30 obtained by capturing an omnidirectional subject of the image capturing apparatus 10 is generated. In the annular image 30, the omnidirectional subject is shown in an annular shape between an inner circle and an outer circle which are a concentric circle. The shape of the subject is distorted in an annular shape due to the optical characteristics of the omnidirectional image capturing optical system 21. That is, the subject is distorted so that the outer edge of the annular image 30 extends further in a circumferential direction than the inner circle of the annular image 30. In order to correct the distortion of the subject and view the captured image, it is necessary to perform the image conversion process of converting the annular image 30 into the long-rectangular-shaped panorama image 40.

In the image conversion process, as shown in FIGS. 8 and 9, the annular image 30 is converted into the long-rectangular-shaped panorama image 40 by cutting the annular image 30 in its radial direction at a predetermined cut position and developing the cut annular image. Here, the cut position refers to a position of a cut line along which the annular image 30 is cut in the radial direction. For example, the cut position is expressed by a rotational angle $\phi$ of the cut line based on a vertical line 32 passing through a central point 31 of the annular image 30. That is, in order to develop the annular image 30 into the panorama image 40, the annular image 30 is cut in its radial direction along the cut line 33 or 34 passing through the central point of the annular image 30. The angle $\phi$ formed by the cut line 33 or 34 and the vertical line 32 passing through the central point 31 of the annular image 30 refers to the cut position. In an example of FIG. 8, a lower portion of the annular image 30 is cut vertically along the cut line 33, and thus the cut position is expressed by $\phi=180°$. On the other hand, in an example of FIG. 9, a left portion of the annular image 30 is cut horizontally along the cut line 34, and thus the cut position is expressed by $\phi=270°$.

However, when the annular image 30 is cut and developed into the panorama image 40, the annular image 30 may be cut in an inappropriate position. In this case, the continuity of the subject shown in the annular image 30 may be damaged in the converted panorama image 40. For example, as shown in FIGS. 8 and 9, a subject 35 to be captured is captured in the upper portion of the annular image 30 when performing the image capturing with the image capturing apparatus 10, since the subject 35 exists in a direction (hereinafter, referred to as a facing direction) in which a photographer 36 operating the image capturing apparatus 10 faces forward. On the other hand, the photographer 36 himself is inclined to be captured in the lower portion of the annular image 30, since the photographer 36 exists in an opposite direction of the facing direction in a view from the image capturing apparatus 10.

When the lower portion of the annular image 30 is cut along the cut line 33 when converting the annular image 30 into the panorama image 40 (where the cut position $\phi=180°$), as shown in FIG. 8, the portion in which the photographer 36 himself is shown is cut. As a consequence, the right half 36a of the photographer and the left half 36b of the photographer are divided into right and left sides with reference to the panorama image 40. When the upper portion of the annular image 30 is cut along a cut line (where the cut position φ=0°), although not illustrated, the subject 35 to be captured is cut. Then, the subject 35 to be captured is divided into the right and left sides with reference to the panorama image 40.

In this way, when the upper portion or the lower portion of the annular image 30 is cut at the cut position of φ=0° or φ=180°, a major subject (for example, the subject 35 to be captured or the photographer 36 himself) is divided in the panorama image 40, and thus the continuity of the subject may be damaged.

However, the cut position determination unit 190 according to this embodiment determines the cut position of the annular image 30 to maintain the continuity of the subject in the annular image 30. The image conversion unit 192 converts the annular image 30 into the panorama image 40 by cutting the annular image 30 at the cut position determined by the cut position determination unit 190 and developing the cut annular image 30 into the long-rectangular-shaped image. Accordingly, the continuity of the major subject can be maintained even in the panorama image 40 obtained by developing the annular image 30.

For example, when the annular image 30 shown in FIGS. 8 and 9 is converted into the panorama image 40, the cut position at which the continuity of the subject in the annular image 30 is maintained is on the left side (φ=270°) or the right side (φ=90°) of the annular image 30, as shown in FIG. 9. At the cut position, the cut line 34 is located on a horizontal line passing through the central point 31 of the annular image 30. The major subjects (for example, the subject 35 to be captured and the photographer 36 himself) which are in the upper portion and the lower portion of the annular image 30 are not cut along the cut line 34. For example, when the cut position is determined on the left portion (φ=270°) of the annular image 30, as shown in FIG. 9, both the subject 35 to be captured and the photographer 36 himself are not divided in the panorama image 40 and thus the continuity of the subject can be maintained.

The example in which the annular image 30 is cut horizontally along the cut line 34 at the position at which the cut position of the annular image 30 is φ=270° or φ=90° has hitherto been described, but the invention is not limited thereto. For example, the angle φ indicating the cut position may be an angle deviated by an angle α (where) 0°<α<90°) from 90° or 270°. That is, the cut position of the annular image 30 may also be a position satisfying a relation of 90°−α<φ<90°+α or 270°−α<φ<270°+α. Then, the annular image 30 can be cut without damage to the continuity of the subject and can be developed into the panorama image 40. Here, the angle α is a predetermined angle satisfying a relation of 0°<α<90°. For example, the angle α is 10°, 30°, 45°, 60°, or the like.

Alternatively, the angle α may be changed depending on an image capturing state or an image capturing environment of the image capturing apparatus 10 when the annular image 30 is generated by the image capturing apparatus 10. Accordingly, since the cut position can be appropriately adjusted depending on the image capturing state or the image capturing environment of the image capturing apparatus 10, the continuity of the subject can be maintained appropriately on the panorama image 40 obtained by converting the annular image 30.

1.6 Image Processing Method

Next, an image processing method performed by the image capturing apparatus 10 according to this embodiment will be described with reference to FIG. 10. FIG. 10 is a flowchart illustrating the image processing method according to this embodiment.

As shown in FIG. 10, the image capturing apparatus 10 first performs the omnidirectional image capturing operation in the state where the adapter 20 is mounted on the image capturing unit 110 (S100). In the omnidirectional image capturing operation, the omnidirectional subject of the image capturing apparatus 10 is captured and the annular image 30 is generated. Subsequently, the record reproduction unit 140 of the image capturing apparatus 10 compresses and codes the annular image 30 in accordance with the predetermined compression coding method, and records the annular image 30 in the recording medium such as a memory card 167 (S102).

Subsequently, when a user operates the operational unit 160 and inputs an instruction to convert the annular image 30 in the image capturing apparatus 10, the image capturing apparatus 10 executes the image conversion process of converting the annular image 30 into the panorama image 40 as in S104 to S110 described below. The image capturing apparatus 10 may automatically execute the image conversion process in response to a predetermined event.

The record reproduction unit 140 of the image capturing apparatus 10 first reproduces the data of the annular image 30 stored in the recording medium such as the memory card 167 (S104). For example, the image capturing apparatus 10 reads the data of the annular image 30 from the recording medium such as the memory card 167, and then decompresses and decodes the data in accordance with the predetermined compression coding method.

Subsequently, the cut position determination unit 190 of the image capturing apparatus 10 determines the cut position of the annular image 30 reproduced in S104 (S106). At this time, the cut position determination unit 190 determines the cut position of the annular image 30 so as to maintain the continuity of the major subject in the annular image 30, even when the annular image 30 is converted into the panorama image 40. For example, as shown in FIG. 9, the cut position of the annular image 30 is determined on the left side or the right side (φ=270° or) φ=90°) of the annular image 30. Therefore, the image of the subject 35 to be captured in the upper portion of the annular image 30 or the image of the photographer 36 himself in the lower portion of the annular image 30 is not divided.

The image conversion unit 192 of the image capturing apparatus 10 converts the annular image 30 into the panorama image 40 by cutting the annular image 30 at the cut position determined in S106 and developing the cut annular image 30 into the long-rectangular-shaped image (S108). The panorama image 40 shown in FIG. 9 is generated by the conversion process.

Subsequently, the record reproduction unit 140 of the image capturing apparatus 10 compresses and codes the panorama image 40 generated in S110 in accordance with a predetermined compression coding method and records the panorama image 40 in the recording medium such as the memory card 167 (S110).

According to the image processing method according to this embodiment, the annular image 30 obtained by the omnidirectional image capturing operation is cut at an appropriate position. Accordingly, the major subject such as the subject 35 to be captured or the photographer 36 himself is not divided even on the panorama image 40 obtained by converting the annular image 30, and thus the continuity of the major subject can be maintained.

2. Second Embodiment

Next, an image capturing apparatus and an image processing method according to a second embodiment of the invention will be described. In the second embodiment, the method of determining the cut position of the annular image 30 is different from the method according to the first embodiment. The other functional configuration is substantially the same as that according to the first embodiment, and the detailed description will be omitted.

2.1 Overview of Image Conversion Process

In order to convert the annular image 30 into the panorama image 40, as described above, it is necessary to cut the annular image 30 at a cut position and develop the cut annular image into the panorama image. However, there is an inclination of the positioning of the subject in the annular image 30 depending on the image capturing state of the image capturing apparatus 10 when the subject is captured and the annular image 30 is generated. Examples of the image capturing state of the image capturing apparatus 10 include a relative positional relationship between the image capturing direction (direction of the optical axis 103 of the image capturing optical system 111) of the image capturing apparatus 10 and the display unit 130 or the handle, and a position of the image capturing apparatus 10. A handle is a hand strap or the like used for a user to hold the image capturing apparatus 10 when performing the omnidirectional image capturing operation.

In the second embodiment, the cut position determination unit 190 determines the cut position of the annular image 30 depending on the image capturing state of the image capturing apparatus 10 when the image capturing apparatus 10 generates the annular image 30. In addition, the image conversion unit 192 cuts the annular image 30 at the cut position depending on the image capturing state and develops the cut annular image 30. In this way, since the annular image 30 can be cut at the user's desired cut position at which there is no major subject in consideration of the arrangement inclination of the subject depending on the image capturing state, the continuity of the subject is not damaged due to the conversion into the panorama image 40.

Hereinafter, a process of determining the cut position of the annular image 30 depending on the image capturing state of the image capturing apparatus 10 when the image capturing apparatus 10 generates the annular image 30 will be described in detail.

The image capturing apparatus 10 records image capturing state information as additional information of the annular image 30 in association with the annular image 30, when the image capturing apparatus 10 records the annular image 30 generated by the omnidirectional image capturing operation in the recording medium (the memory card 167 or the like).

The image capturing state information refers to information indicating the state of the image capturing apparatus 10 when the image capturing apparatus 10 generates the annular image 30. Examples of the image capturing state information include information indicating a positional relationship between an image capturing direction of the image capturing apparatus 10 at the image capturing time and the display unit 130 or a handle and information indicating the position of the image capturing apparatus 10. For example, the rotational angle θ of the image capturing unit 110 with respect to the main body 100 can be used as the information indicating the positional relationship between the image capturing direction and the display unit 130 or the handle. A position sensor (an acceleration sensor, a gyro sensor, or the like) may be installed in the image capturing apparatus 10 to obtain information indicating the position of the image capturing apparatus 10 at the image capturing time by detecting the position (for example, a roll angle α, a pitch angle β, or a yaw angle γ) of the image capturing apparatus 10 by the position sensor.

Subsequently, the image capturing apparatus 10 reads the annular image 30 and the image capturing state information added to the annular image 30 from the recording medium and reproduces the annular image 30 and the image capturing state information, when the annular image 30 is converted into the panorama image 40. Subsequently, based on the image capturing state information, the cut position determination unit 190 of the image capturing apparatus 10 determines a position, at which the continuity of the subject is likely to be maintained, as the cut position of the annular image 30. Then, the image conversion unit 192 converts the annular image 30 into the panorama image 40 by cutting the annular image 30 at the determined cut position and developing the cut annular image 30. Hereinafter, a specific example in which the cut position of the annular image 30 is determined depending on the image capturing state of the image capturing apparatus 10 when the image capturing apparatus 10 generates the annular image 30 will be described in detail.

2.2 Example 1 in Which Cut Position Is Determined Based on Positional Relationship between Image Capturing Direction and Display Unit 130

An example in which the cut position is determined depending on a positional relationship (for example, a rotational state of the image capturing unit 110) between the image capturing direction when performing the omnidirectional image capturing operation by the image capturing apparatus 10 shown in FIGS. 1 to 5 and the display unit 130 will be first described with reference to FIGS. 11A to 13B.

In the image capturing apparatus 10 shown in FIGS. 1 to 5, as described above, the image capturing unit 110 is rotatable relative to the main body 100, and the direction (image capturing direction) of the image capturing unit 110 and the direction of the display screen of the display unit 130 can be changed. In the image capturing apparatus 10 having such a rotatable mechanism, by orienting the image capturing unit 110 and the display unit 130 in the same direction, as shown in FIG. 3, a user (photographer) can take a photograph of himself while viewing the through-image of the user displayed on the display unit 130 (self-image capturing). The image capturing apparatus 10 having the self-image capturing function has a reversing display function of reversing and displaying the upper, lower, right, and left portions of the captured image on the display unit 130 when the user takes a photograph of himself. The reversing display function enables the captured image to be displayed in reverse when the user takes a photograph of himself, and thus the image can be displayed in a natural direction for the user.

The reversing display function at the normal image capturing time will be described with reference to FIGS. 11A and 11B. When the image capturing unit 110 is oriented in the front direction of the image capturing apparatus 10 (rotational angle θ=0°), as shown in FIG. 11A, a subject Mount Fuji located in the front surface of the image capturing apparatus 10 is captured and a captured image 132 of Mount Fuji is displayed on the display unit 130. In this case, since the rotational angle θ of the image capturing unit 110 is smaller than a reference angle $θ_0$ (for example $θ_0$=120°), the control unit 150 cancels the reversing display function. Therefore, the captured image 132 is not displayed in reverse in either the upper and lower directions or the right and left directions.

On the other hand, when the image capturing unit 110 is rotated and oriented in a rear direction of the image capturing apparatus 10 (rotational angle θ=180°), as shown in FIG. 11B, the face of the user located in the rear direction of the image capturing apparatus 10 is captured and thus a captured image 134 of the user is displayed on the display unit 130. In this case, since the rotational angle θ of the image capturing unit 110 is equal to or larger than the reference angle $θ_0$ (for example $θ_0$=120°), the control unit 150 activates the reversing display function. Therefore, the reversing display function enables the captured image 134 to be displayed in reverse in both the upper and lower directions and the right and left directions. In FIG. 11B, a captured image 136 which is not displayed in reverse is also displayed for reference. Accordingly, by displaying the captured image 134 reversed in the upper and lower directions and the right and left directions on the display unit 130 when the user takes a photograph of himself at the rotational angle θ in the vicinity of 180°, the face of the user is displayed on the display unit 130 just as the face is shown on a mirror and thus the user can easily adjust the a viewing angle.

The reversing display function is a function of reversing a captured image in the upper and lower directions and the right and left directions, but the invention is not limited to this example. For example, the reversing display function may be a function of reversing a captured image only in the upper and lower directions. Alternatively, when the rotational direction of the image capturing unit 110 is a direction horizontal to the main body 100, the reversing display function may be a function of reversing a captured image only in the right and left directions.

Next, a case where the adapter 20 is mounted on the image capturing unit 110 to perform the omnidirectional image capturing operation, as shown in FIGS. 12A, 12B, 13A, and 13B, in the image capturing apparatus 10 having a rotatable mechanism of the image capturing unit 110 and the reversing display function will be described. Even when performing the omnidirectional image capturing operation, the reversing display function also enables the annular image 30 to be displayed in reverse depending on the relative positional relationship (for example, the rotational angle θ of the image capturing unit 110) between the image capturing direction of the image capturing unit 110 and the display unit 130.

Figure 13A:
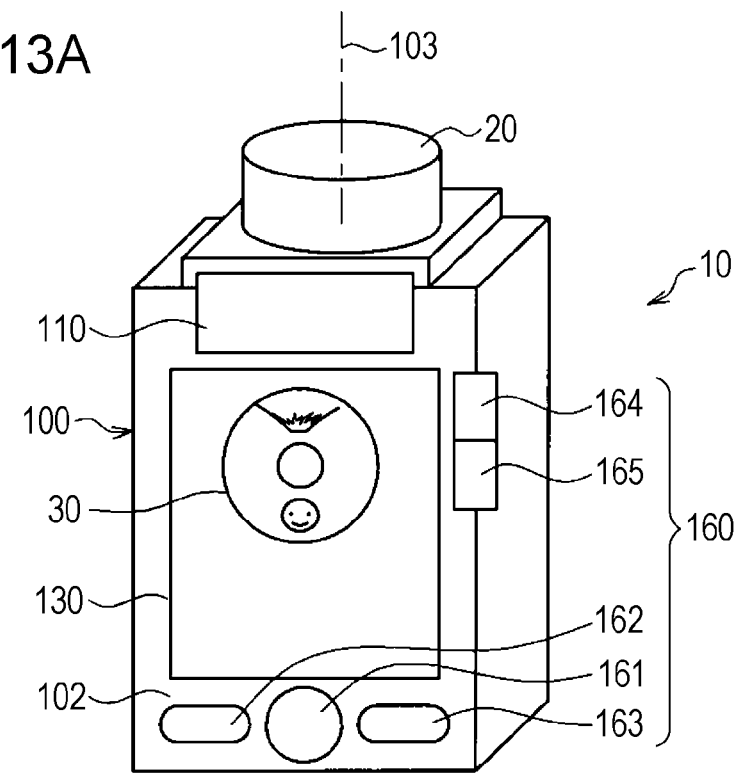
FIGS. 13A and 13B are perspective views illustrating the rotation states of an image capturing unit of the image capturing apparatus according to the first embodiment.

For example, as shown in FIGS. 12A and 13A, a state (first image capturing state) is assumed where a photographer holds the image capturing apparatus 10 so that the display unit 130 of the main body 100 is nearly parallel to a vertical direction (that is, the photographer vertically holds the image capturing apparatus) to perform the omnidirectional image capturing operation when the rotational angle θ of the image capturing unit 110 mounted with the adapter 20 is 90°. At this time, the image capturing direction (the direction of the optical axis 103 of the image capturing optical system 111) of the image capturing apparatus 10 is oriented vertically upward and is perpendicular to the direction of the display unit 130. Since the subject 35 to be captured is present in the facing direction of the photographer in the first image capturing state, the subject 35 to be captured is displayed in the upper portion of the annular image 30 obtained by the omnidirectional image capturing operation and the photographer 36 himself is displayed in the lower portion of the annular image 30.

Figure 13B:
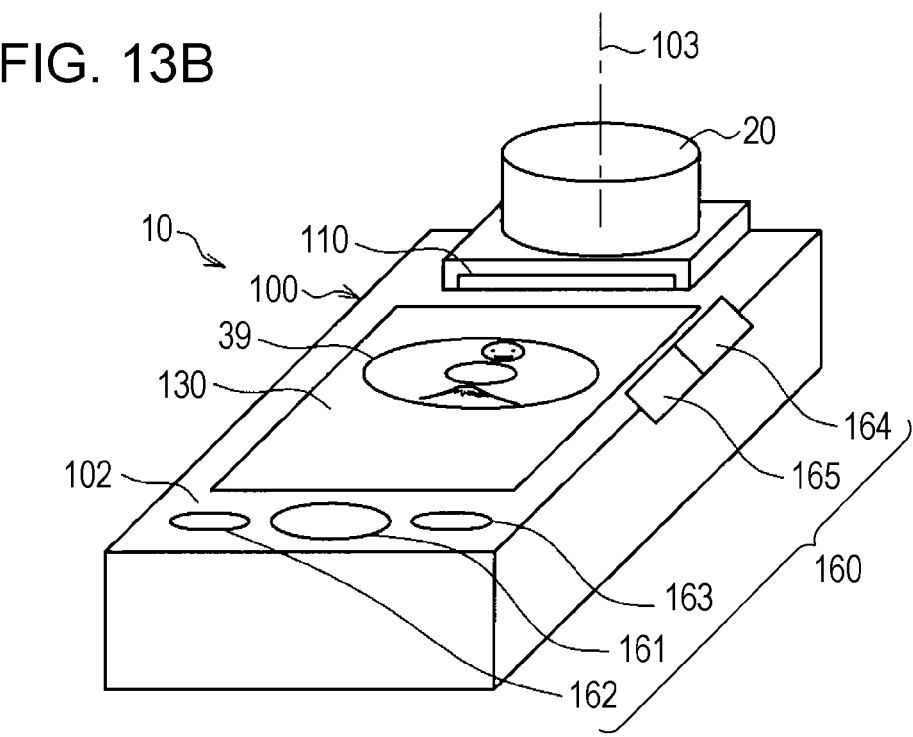

It is assumed that the photographer changes the image capturing state from the first image capturing state to a second image capturing state shown in FIGS. 12B and 13B to perform the omnidirectional image capturing operation on the same scene. In the second image capturing state, as shown in FIGS. 12B and 13B, the user tilts down horizontally and holds the image capturing apparatus 10 so that the display unit 130 is nearly parallel to the horizontal direction, and the image capturing unit 110 is rotated toward the photographer so that the rotational angle θ is changed to 180°. At this time, the direction of the display unit 130 is oriented vertically upward and is a parallel to the image capturing direction of the image capturing apparatus 10. In the second image capturing state, an annular image 39 obtained by reversing the annular image 30 in the upper, lower, right, and left directions by reversing a display function is displayed on the display unit 130. The photographer 36 is displayed in the upper portion of the annular image 39 and the subject 35 to be captured is displayed in the lower portion of the annular image 39.

When the cut position of the annular image 30 is typically fixed to a constant position (for example, the left side of the annular image 30 is cut along the cut line 37 at ϕ=270°) when displaying the annular image 30 in reverse, the panorama image 40 obtained by converting the annular image 30 shown in FIG. 12A and the panorama image 40 obtained by converting the annular image 39 shown in FIG. 12B may become different from each other. Therefore, the photographer may find it unpleasant since the different panorama image 40 is generated even though the same scene is captured in the same direction.

In this embodiment, however, the cut position of the annular image 39 displayed in reverse shown in FIG. 12B is changed to a position (ϕ=90°) symmetrical to the cut position (ϕ=270°) of the annular image 30 shown in FIG. 12A, and then the right side of the annular image 39 is cut along the cut line 38. Accordingly, the same panorama image 40 can be obtained by cutting two annular images (the annular image 30 shown in FIG. 12A and the annular image 39 displayed in reverse shown in FIG. 12B) generated by capturing the same scene at the user's desired same cut position.

In order to determine the cut position, the image capturing apparatus 10 stores the respective rotational angles θ of the image capturing unit 110 when the two annular images 30 and 39 are generated as the image capturing state information. The cut position determination unit 190 determines the cut position (angle ϕ) depending on the rotational angle θ of the image capturing unit 110. For example, when the rotational angle θ of the image capturing unit 110 is smaller than 120° and the annular image is not displayed in reverse, as shown in FIGS. 12A and 13A, the cut position determination unit 190 determines the cut position of the annular image 30 as the cut line 37 (ϕ=270°) on the left side of the annular image 30. On the other hand, when the rotational angle θ of the image capturing unit 110 is equal to or larger than 120° and the annular image is displayed in reverse, as shown in FIGS. 12B and 13B, the cut position determination unit 190 determines the cut position of the annular image 39 as the cut line 38 (ϕ=90°) on the right side of the annular image 39. The image conversion unit 192 cuts the annular image 30 or 39 at the determined cut position (ϕ=270° or 90°) and develops the cut annular image into the panorama image 40.

In this embodiment, the cut positions (ϕ) of the annular images 30 and 39 are determined depending on the relative positional relationship (for example, rotational angle θ of the image capturing unit 110) between the image capturing direction when generating the annular image 30 and the direction of the display unit 130. Accordingly, since the annular images 30 and 39 each are cut and developed at the cut position suitable for the relative positional relationship, the panorama image 40 where the user does not find it unpleasant can be generated without damage to the continuity of the subject.

2.3 Example 2 in Which Cut Position Is Determined Based on Positional Relationship between Image Capturing Direction and Display Unit 130

Figure 14A:
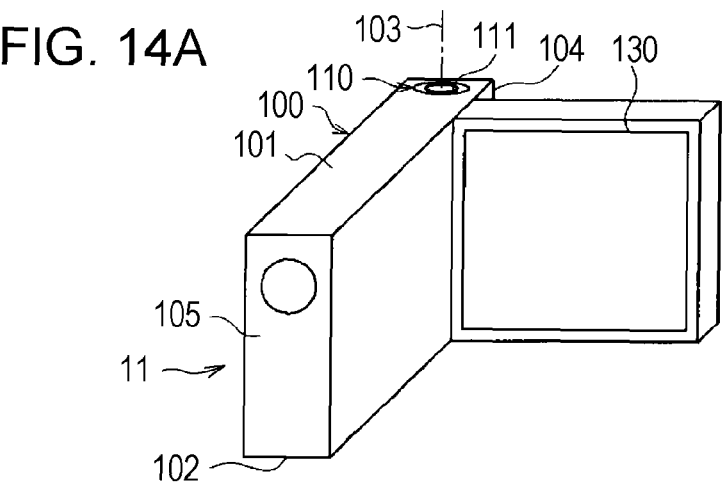
FIGS. 14A to 14C are perspective views illustrating an image capturing apparatus according to another embodiment of the invention.
Figure 14B:
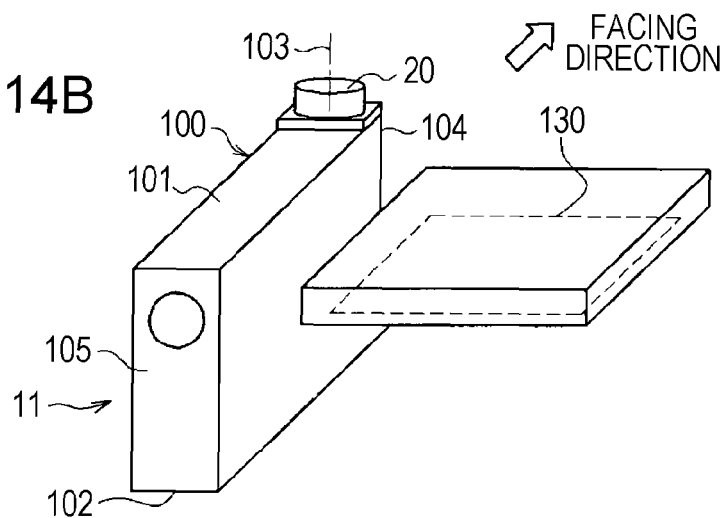
Figure 14C:
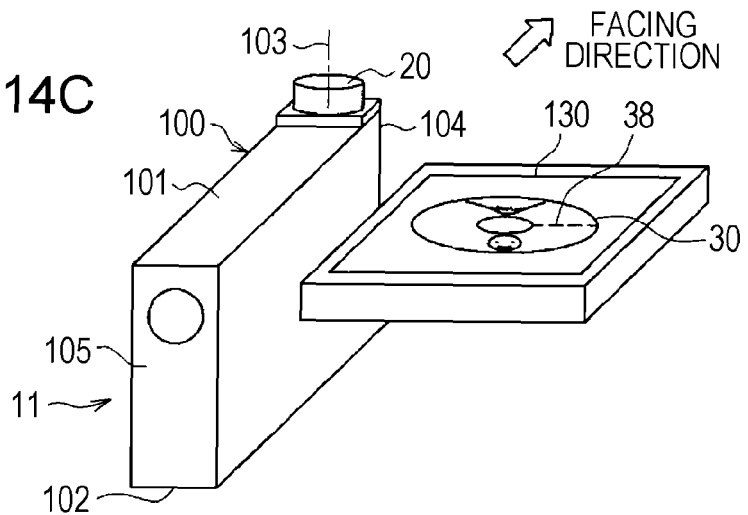

Next, an example in which the cut position is determined depending on a positional relationship (for example, a rotational state of the display unit 130) between the image capturing direction when performing the omnidirectional image capturing operation by the image capturing apparatus 11 according to another embodiment of the invention and the display unit 130 will be described with reference to FIGS. 14A to 14C. FIGS. 14A to 14C are perspective views illustrating the image capturing apparatus 11 according to another embodiment of the invention.

The image capturing apparatus 11 shown in FIGS. 14A to 14C is different from the image capturing apparatus 10 according to the first embodiment in that a rotational mechanism rotating the display unit 130 is provided instead of the image capturing unit 110. The other functional configuration is substantially the same as that of the first embodiment and the detailed description will be omitted.

As shown in FIGS. 14A to 14C, the image capturing apparatus 11 includes the rotational mechanism rotating the display unit 130 relative to the main body 100. By rotating the display unit 130 by the rotational mechanism, the display screen of the display unit 130 can be oriented in a desired direction such as a front surface 101 (in the image capturing direction), a rear surface 102 (on the side of the photographer), a top surface 104, or a bottom surface 105 of the image capturing apparatus 11. In a normal image capturing operation, by orienting the display screen of the display unit 130 toward the rear surface 102 (on the side of the photographer) of the image capturing apparatus 11, the photographer can take a photograph of a subject located toward the front surface 101 (in the facing direction of the photographer) of the image capturing apparatus 11 while viewing the captured image displayed on the display unit 130. In the self-image capturing operation, by orienting the display screen of the display unit 130 toward the front surface 101 of the image capturing apparatus 11, the user can take a photograph of himself while viewing the captured image of himself displayed on the display unit 130.

The image capturing apparatus 11 also have the reversing display function described with reference to FIGS. 11A and 11B. Therefore, in the self-image capturing operation, the reversing display function enables the captured image displayed on the display unit 130 to be displayed in reverse in the upper, lower, right, and left directions. The rotation detection unit 170 (see FIG. 7) according to the first embodiment detects the rotational state of the image capturing unit 110 with respect to the main body 100. However, the rotation detection unit 170 of the image capturing apparatus 11 shown in FIGS. 14A to 14C detects the rotational state (rotational angle $\psi$) of the display unit 130 with respect to the main body 100. In this way, the control unit 150 displays the captured image (the annular image 30) in reverse based on the rotational state of the display unit 130.

Next, an omnidirectional image capturing operation of the image capturing apparatus 11 shown in FIGS. 14A to 14C will be described. The image capturing unit 110 of the image capturing apparatus 11 is not rotated and is fixed (see FIG. 14A), but the removable adapter 20 may be mounted on the image capturing unit 110 as in the first embodiment (see FIGS. 14B and 14C). When the adapter 20 is mounted on the image capturing unit 110, the image capturing apparatus 11 can perform the omnidirectional image capturing operation using the omnidirectional image capturing optical system 21 of the adapter 20. When performing the omnidirectional image capturing operation, as shown in FIGS. 14A to 14C, by disposing the image capturing apparatus 10 so that the direction (image capturing direction) of the optical axis 103 of the image capturing optical system 111 is oriented upward, an omnidirectional (360°) subject within a horizontal plane including the adapter 20 can be captured.

Even when performing the omnidirectional image capturing operation by the image capturing apparatus 11, the annular image 30 is also displayed on the display unit 130 in reverse in response to the rotational angle $\psi$ of the display unit 130 by the reversing display function. For example, when the display screen of the display unit 130 is oriented in a direction (downward direction of the drawing) opposite to the image capturing direction ($\psi=0°$), as shown in FIG. 14B, the control unit 150 does not display the annular image 30 in reverse on the display unit 130. On the other hand, when the display screen of the display unit 130 is oriented in the image capturing direction (upward direction of the drawing) ($\psi=180°$), as shown in FIG. 14C, the control unit 150 displays the annular image 30 in reverse on the display unit 130.

Like the image capturing apparatus 10 shown in FIGS. 13A and 13B, the image capturing apparatus 11 shown in FIGS. 14A to 14C stores the rotational angle $\psi$ of the display unit 130 obtained in the omnidirectional image capturing operation as the image capturing state information. The cut position determination unit 190 determines the cut position (angle $\phi$) of the annular image 30 in response to the rotational angle $\psi$ of the display unit 130. For example, when the rotational angle $\psi$ of the display unit 130 is 0° and the annular image is not displayed in reverse, as shown in FIG. 14B, the cut position determination unit 190 determines the cut position of the annular image 30 as the cut line)($\phi=270°$) on the left side of the annular image (not shown). On the other hand, when the rotational angle $\psi$ of the display unit 130 is 180° and the annular image 30 is displayed in reverse, as shown in FIG. 14C, the cut position determination unit 190 determines the cut position of the annular image 30 as the cut line 38 ($\phi=90°$) on the right side of the annular image 30. Then, the image conversion unit 192 cuts the annular image 30 at the determined cut position ($\phi=270°$ or 90°) and develops the cut annular image 30 into the panorama image 40.

In the image capturing apparatus 11 shown in the examples of FIGS. 14A to 14C, the cut position ($\phi$) of the annular image 30 is determined depending on the relative positional relationship (for example, the rotational angle $\psi$ of the display unit 130) between the image capturing direction when the annular image 30 is generated and the direction of the display unit 130. Accordingly, since the annular image 30 can be cut and developed at the cut position suitable for the relative positional relationship, the panorama image 40 where the user does not find it unpleasant can be generated without damage to the continuity of the subject.

Figure 15:
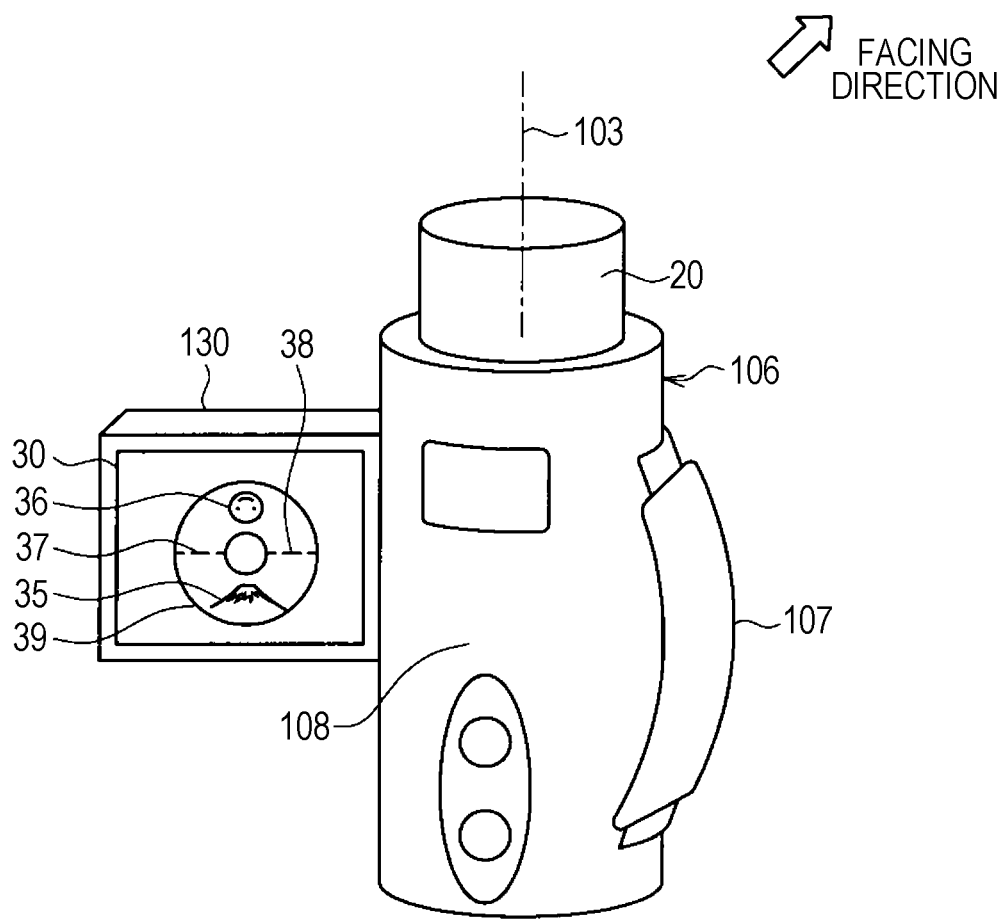
FIG. 15 is a perspective view illustrating an image capturing apparatus according to still another embodiment of the invention.

2.4 Example in Which Cut Position Is Determined Based on Positional Relationship between Image Capturing Direction and Handle Next, an example in which the cut position is determined depending on a positional relationship between the image capturing direction when performing the omnidirectional image capturing operation by an image capturing apparatus 12 according to still another embodiment of the invention and a handle of the image capturing apparatus 12 will be described with reference to FIG. 15. FIG. 15 is a perspective view illustrating the image capturing apparatus 12 according to still another embodiment of the invention.

As shown in FIG. 15, the image capturing apparatus 12 is configured as a video camera including a substantially cylindrical housing 106, for example. When a normal image capturing operation is performed using the image capturing apparatus 12, a photographer holds the image capturing apparatus 12 by inserting the right hand through a hand strap 107 mounted on one side of the housing 106 from the downside. The hand strap 107 corresponds to the handle of the image capturing apparatus 12. Then, the photographer takes a normal photograph of a desired subject in the image capturing direction (direction of the optical axis 103 of the image capturing optical system 111) of the image capturing apparatus 12.

When the adapter 20 is mounted on the image capturing apparatus 12 to perform the omnidirectional image capturing operation, the photographer holds the image capturing apparatus 12 by inserting the right hand from the upside through the hand strap 107 to orient the image capturing direction upward, and rotates the display unit 130 to orient the display unit 130 toward himself. Then, the photographer can stably grasp the image capturing apparatus 12 using the hand strap 107 and can also perform the omnidirectional image capturing operation while viewing the annular image 39 on the display unit 130.

In this image capturing state, since the photographer is located at the position facing an upper surface 108 of the image capturing apparatus 12, the facing direction of the photographer becomes a bottom surface direction (direction of the rear surface of the display unit 130) of the image capturing apparatus 12. Therefore, in the annular image 39 displayed on the display unit 130, the photographer 36 himself is located in the upper portion of the annular image 39 and the subject 35 to be captured in the facing direction of the photographer is located in the lower portion of the annular image 39.

In this way, the disposition of the subject in the annular image 39 is determined depending on the relative positional relationship between the image capturing direction of the image capturing apparatus 12 and the handle (the hand strap 107). Accordingly, when the cut position of the annular image 39 is determined depending on the relative positional relationship, the annular image 39 can be developed into the panorama image 40 without cutting the major subject in the annular image 39.

Based on information indicating the relative positional relationship between the image capturing direction and the handle, the cut position determination unit 190 of the image capturing apparatus 12 determines the position, at which the major subject in the annular image 39 is not cut, as the cut position of the annular image 39. For example, the cut position determination unit 190 determines the cut position of the annular image 39 so that the left side of the annular image 39 is cut along the cut line 37 or the right side of the annular image 39 is cut along the cut line 38 ($\phi$=270° or 90°). The image conversion unit 192 cuts the annular image 39 at the determined cut position ($\phi$=270° or 90°) and develops the cut annular image 39 into the panorama image 40. Accordingly, since the annular image 39 can be cut and developed at the cut position suitable for the relative positional relationship, the panorama image 40 can be generated without damage to the continuity of the subject.

3. Summary

The image capturing apparatuses 10, 11, and 12 and the image processing methods thereof according to the preferred embodiments of the invention have hitherto been described. According to these embodiments, the cut position of the annular image 30 or 39 is determined on the left side or the right side of the annular image 30 to maintain the continuity of the subject when the annular image 30 or 39 generated in the omnidirectional image capturing operation is converted into the panorama image 40. Accordingly, the annular image 30 or 39 can be developed into the panorama image 40 without damage to the continuity of the major subject in the annular image 30 or 39.

According to the second embodiment, based on the image capturing state information added to the annular image 30 or 39, the cut position of the annular image 30 or 39 is determined as the position suitable for the image capturing state when the annular image 30 or 39 is generated. For example, the cut position of the annular image 30 or 39 is determined depending on the relative positional relationship between the image capturing direction of the image capturing apparatus 10, 11, or 12 when the omnidirectional image capturing operation and the display 130 or the handle. Thus, the cut position of the annular image 30 or 39 can be determined as an appropriate position in consideration of the inclination of the positioning of the subject depending on the image capturing state. Accordingly, when the annular image 30 or 39 is developed into the panorama image 40, the continuity of the subject can be maintained more reliably.

The preferred embodiments of the invention have hitherto been described with reference to the accompanying drawings, but the invention is not limited thereto. It is apparent to those skilled in the art that various modifications and alterations may occur within the technical spirit described in the scope of the claims, and it should be understood that the modifications and alterations, of course, belong to the technical scope of the invention.

In the above-described embodiments, for example, the twice-reflection type omnidirectional image capturing optical system 21 and the once-reflection type omnidirectional image capturing optical system 25 have been exemplified, but the omnidirectional image capturing optical system according to the embodiments of the invention is not limited thereto. For example, the omnidirectional image capturing optical system 21 reflecting light from a subject three or more times may used. The shape of the reflection surface, a permeable surface, or the like of the omnidirectional image capturing optical system is not limited to the illustrated examples, and may be arbitrarily modified in design.

In the image capturing apparatuses 10, 11, and 12 according to the above-described embodiments, the adapter 20 including the omnidirectional image capturing optical system 21 is detachably mounted, but the invention is not limited thereto. The omnidirectional image capturing apparatus may be an image capturing apparatus that has an omnidirectional image capturing optical system therein as long as the omnidirectional image capturing optical system can perform the omnidirectional image capturing operation to generate an annular image. That is, the image capturing apparatus generating the annular image according to the embodiments of the invention may be an image capturing apparatus dedicated to the omnidirectional image capturing operation. The image capturing apparatus is not limited to a digital camera for customers, but may be a monitoring camera or an image capturing apparatus for an endoscopic camera for business purpose.

In the above-described embodiments, the examples have hitherto been described in which the image processing apparatus according to the embodiments of the invention is applied to the image capturing apparatus 10, 11, or 12 and the image capturing apparatus itself generating the annular image 30 in the omnidirectional image capturing operation converts the annular image 30 into the panorama image 40. However, the image processing apparatus according to the embodiments of the invention is not limited thereto. For example, the image processing apparatus may be applied to any electronic apparatus such as a personal computer, a mobile phone, a portable video/voice player, a television receiver, an image recording/reproduction apparatus, a game console, a digital photo frame apparatus, or a car navigation apparatus, with an image processing function.

When the image processing apparatus is not the omnidirectional image capturing apparatus, the data of the annular image generated by the omnidirectional image capturing apparatus may be supplied to the image processing apparatus via the recording medium such as the memory card 167 or a communication network such as the Internet or a LAN. The omnidirectional image capturing apparatus may add the image capturing state information to the data of the generated annular image and the image processing apparatus may determine the cut position of the annular image based on the image capturing state information added to the data of the annular image.

The present application contains subject matter related to that disclosed in Japanese Priority Patent Application JP 2009-298946 filed in the Japan Patent Office on Dec. 28, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   at least one processor configured to select a cut position, from among at least first and second possible cut positions capable of being selected, at which an annular image is to be cut in a radial direction, the at least one processor being configured to select the cut position based on image capturing state information indicating a relative position between components of the omnidirectional image capturing apparatus when the omnidirectional image capturing apparatus generates the annular image, wherein the image capturing state information includes information indicating a relative positional relationship between an image capturing direction of the omnidirectional image capturing apparatus when the omnidirectional image capturing apparatus generates the annular image and a display unit of the omnidirectional image capturing apparatus, and wherein the at least one processor is further configured to convert the annular image into a long-rectangular-shaped panorama image by cutting the annular image at the selected cut position.

2. The image processing apparatus according to claim 1, wherein the at least one processor is further configured to select the cut position on a left side or a right side of the annular image.

3. The apparatus of claim 1, wherein the at least one processor is further configured to develop the cut annular image.

4. The image capturing apparatus according to claim 1, wherein:
   the apparatus further comprises a display; and
   the processor is further configured to cause the annular image to be presented in a first orientation on the display when the image capturing state information causes the first possible cut position to be selected, and to cause the annular image to be presented in a second orientation on the display when the image capturing state information causes the second possible cut position to be selected.

5. The image capturing apparatus according to claim 4, wherein the processor is further configured to generate the annular image in the second orientation by reversing the annular image in the first orientation in at least one direction.

6. The image capturing apparatus according to claim 5, wherein the second possible cut position is 180 degrees from the first possible cut position.

7. An image processing method comprising acts of:
   with at least one device, selecting a cut position, from among at least first and second possible cut positions capable of being selected by the at least one device, at which an annular image is to be cut in a radial direction, wherein the act of selecting comprises selecting the cut position based on image capturing state information indicating a relative position between components of the omnidirectional image capturing apparatus when the omnidirectional image capturing apparatus generates the annular image, wherein the image capturing state information includes information indicating a relative positional relationship between an image capturing direction of an omnidirectional image capturing apparatus when the omnidirectional image capturing apparatus generates the annular image and a display unit of the omnidirectional image capturing apparatus; and
   converting the annular image into a long-rectangular-shaped panorama image by cutting the annular image at the selected cut position.

8. The method of claim 7, wherein the act of converting further comprises developing the cut annular image.

9. The method according to claim 7, wherein the act of selecting further comprises selecting the cut position on a left side or a right side of the annular image.

10. The image capturing method according to claim 7, further comprising acts of:
    with the at least one device, causing the annular image to be presented in a first orientation on a display when the image capturing state information causes the first possible cut position to be selected; and
    with the at least one device, causing the annular image to be presented in a second orientation on the display when the image capturing state information causes the second possible cut position to be selected.

11. The image capturing method according to claim 10, wherein the act of causing the annular image to be presented in the second orientation comprises:
    generating the annular image in the second orientation by reversing the annular image in the first orientation in at least one direction.

12. The image capturing method according to claim 11, wherein the second possible cut position is 180 degrees from the first possible cut position.

13. A non-transitory computer-readable medium having instructions encoded thereon which, when executed by at least one processor, cause the at least one processor to execute a method comprising acts of:
    selecting a cut position, from among at least first and second possible cut positions capable of being selected by the at least one processor, at which an annular image is to be cut in a radial direction, wherein the act of selecting comprises selecting the cut position based on image capturing state information indicating a relative position between components of the omnidirectional image capturing apparatus when the omnidirectional image capturing apparatus generates the annular image, wherein the image capturing state information includes information indicating a relative positional relationship between an image capturing direction of an omnidirectional image capturing apparatus when the omnidirectional image capturing apparatus generates the annular image and a display unit of the omnidirectional image capturing apparatus; and converting the annular image into a long-rectangular-shaped panorama image by cutting the annular image at the selected cut position.

14. The computer-readable medium of claim 13, having additional instructions encoded thereon which, when executed by the at least one processor, cause the at least one processor to perform a further act of developing the cut annular image.

15. The computer-readable medium according to claim 13, having additional instructions encoded thereon which, when executed by the at least one processor, cause the at least one processor to perform the act of selecting so as to comprise selecting the cut position on a left side or a right side of the annular image.

16. The computer-readable medium of claim 13, having additional instructions encoded thereon which, when executed by the at least one processor, cause the at least one processor to perform acts of:

causing the annular image to be presented in a first orientation on a display when the image capturing state information causes the first possible cut position to be selected; and causing the annular image to be presented in a second orientation on the display when the image capturing state information causes the second possible cut position to be selected.

17. The computer-readable medium according to claim 16, wherein the act of causing the annular image to be presented in the second orientation comprises:

generating the annular image in the second orientation by reversing the annular image in the first orientation in at least one direction.

18. The computer-readable medium according to claim 17, wherein the second possible cut position is 180 degrees from the first possible cut position.

* * * * *